US009856544B2

(12) United States Patent
Young et al.

(10) Patent No.: US 9,856,544 B2
(45) Date of Patent: Jan. 2, 2018

(54) HYDROGEN STORAGE ALLOYS

(71) Applicant: BASF Corporation, Florham Park, NJ (US)

(72) Inventors: Kwo Young, Troy, MI (US); Diana Wong, Sterling Heights, MI (US); Jean Nei, Southgate, MI (US)

(73) Assignee: BASF Corporation, Florham Park, NJ (US)

( * ) Notice: Subject to any disclaimer, the term of this patent is extended or adjusted under 35 U.S.C. 154(b) by 4 days.

(21) Appl. No.: 14/619,374

(22) Filed: Feb. 11, 2015

(65) Prior Publication Data

US 2016/0230254 A1    Aug. 11, 2016

(51) Int. Cl.
| | |
|---|---|
| *C22C 30/00* | (2006.01) |
| *C22C 14/00* | (2006.01) |
| *C22C 30/04* | (2006.01) |
| *C22C 16/00* | (2006.01) |
| *C22C 27/02* | (2006.01) |
| *C22C 27/06* | (2006.01) |
| *C22C 19/05* | (2006.01) |
| *H01M 4/38* | (2006.01) |
| *H01M 12/08* | (2006.01) |
| *H01M 8/083* | (2016.01) |
| *H01M 10/34* | (2006.01) |
| *H01M 8/065* | (2016.01) |
| *H01M 8/04082* | (2016.01) |

(52) U.S. Cl.
CPC ............... *C22C 14/00* (2013.01); *C22C 16/00* (2013.01); *C22C 19/058* (2013.01); *C22C 27/025* (2013.01); *C22C 27/06* (2013.01); *C22C 30/00* (2013.01); *C22C 30/04* (2013.01); *H01M 4/383* (2013.01); *H01M 8/04216* (2013.01); *H01M 8/065* (2013.01); *H01M 8/083* (2013.01); *H01M 10/345* (2013.01); *H01M 12/08* (2013.01); *Y02E 60/128* (2013.01)

(58) Field of Classification Search
CPC .......................... C22C 2202/04; C22C 30/00
USPC ............... 148/442; 252/182.1; 420/580, 900; 429/223
See application file for complete search history.

(56) References Cited

U.S. PATENT DOCUMENTS

| | | | |
|---|---|---|---|
| 5,840,440 A | 11/1998 | Ovshinsky et al. | |
| 6,270,719 B1 | 8/2001 | Fetcenko et al. | |
| 6,536,487 B2 | 3/2003 | Ovshinsky et al. | |
| 2013/0277607 A1 | 11/2013 | Young et al. | |

FOREIGN PATENT DOCUMENTS

| | | |
|---|---|---|
| JP | 2012-227106 A | 11/2012 |
| WO | 2004/094680 A1 | 11/2004 |
| WO | 2014/107732 A2 | 7/2014 |

OTHER PUBLICATIONS

Journal of Alloys and Compounds, vol. 580, Dec. 15, 2013, Supplement 1.
Materials 2013, Young, et al., vol. 6, pp. 4574-4608.
Journal of Power Sources, 2012, Young, et al., vol. 215, pp. 279-287.
English Language Abst. of JP 2012-227106, Nov. 15, 2012.
Int. Search Report/Written Opinion dated Jun. 7, 2016.
Young et al., Journal of Alloys and Compounds, vol. 643, pp. 17-27 Apr. 24, 2015.

*Primary Examiner* — Brian Walck
(74) *Attorney, Agent, or Firm* — Dinsmore & Shohl LLP

(57) ABSTRACT

Hydrogen storage alloys comprising a) at least one main phase, b) a storage secondary phase and c) a catalytic secondary phase, where the weight ratio of the catalytic secondary phase abundance to the storage secondary phase abundance is ≥3; or comprising a) at least one main phase, b) from 0 to about 13.3 wt % of a storage secondary phase and c) a catalytic secondary phase, where the alloy comprises from 0.05 at % to 0.98 at % of one or more rare earth elements; or comprising a) at least one main phase, b) from 0 to about 13.3 wt % of a storage secondary phase and c) a catalytic secondary phase, where the alloy comprises for example i) one or more elements selected from the group consisting of Ti, Zr, Nb and Hf and ii) one or more elements selected from the group consisting of V, Cr, Mn, Ni, Sn, Al, Co, Cu, Mo, W, Fe, Si, Sn and rare earth elements, where the atomic ratio of ii) to i) is from about 1.80 to about 1.98, exhibit improved electrochemical properties, for instance improved low temperature electrochemical performance.

22 Claims, No Drawings

HYDROGEN STORAGE ALLOYS

The present invention relates to hydrogen storage alloys with improved electrochemical properties. The alloys are for example modified $AB_x$ type alloys where x is from about 0.5 to about 5.

Alloys capable of absorbing and desorbing hydrogen may be employed as hydrogen storage media and/or as electrode materials for solid hydrogen storage media, metal hydride batteries, fuel cells, metal hydride air battery systems and the like. Such materials are known as metal hydride (MH) materials.

Efforts continue to improve the electrochemical properties of ABx MH alloys, employed for example as the active anode material in batteries. Nickel metal hydride (NiMH) batteries are a green technology and have replaced toxic nickel cadmium (NiCd) batteries in all applications except those that require discharge capability at low temperature (e.g. <25° C.). Further improvement of low temperature electrochemical performance of ABx metal hydride alloys will allow complete removal of NiCd batteries from the consumer market.

Surprisingly, it has been found that certain metal hydride alloys exhibit improved electrochemical properties, for instance improved low temperature electrochemical properties.

Disclosed is a hydrogen storage alloy, comprising
a) at least one main phase,
b) a storage secondary phase and
c) a catalytic secondary phase,
where the weight ratio of the catalytic secondary phase abundance to the storage secondary phase abundance is ≥3.

Also disclosed is a hydrogen storage alloy, comprising
a) at least one main phase,
b) optionally a storage secondary phase and
c) a catalytic secondary phase,
where the alloy comprises from 0.05 at % to 0.98 at % of one or more rare earth elements.

Also disclosed is a hydrogen storage alloy which exhibits an improvement of surface catalytic ability at −40° C., defined as the product of charge transfer resistance (R) and double layer capacitance (C), of at least 10%, relative to the $AB_2$ alloy $Ti_{12.0}Zr_{21.5}V_{10.0}Cr_{7.5}Mn_{8.1}Ni_{32.2}Sn_{0.3}Al_{0.4}Co_{8.0}$; and/or
a charge transfer resistance at −40° C. of ≤60 Ω·g; and/or
a surface catalytic ability at −40° C., defined as the product of charge transfer resistance (R) and double layer capacitance (C), of ≤30 seconds.

Also disclosed is a hydrogen storage alloy, comprising
a) at least one main phase,
b) optionally a storage secondary phase and
c) a catalytic secondary phase,
where the alloy comprises
i) one or more elements selected from the group consisting of Ti, Zr, Nb and Hf and
ii) one or more elements selected from the group consisting of V, Cr, Mn, Ni, Sn, Al, Co, Cu, Mo, W, Fe, Si and rare earth elements; or
i) one or more elements selected from the group consisting of Ti, Zr, Nb and Hf and
ii) Ni, Cr and one or more elements selected from the group consisting of B, Al, Si, Sn, other transition metals and rare earth elements; or
i) one or more elements selected from the group consisting of Ti, Zr, Nb and Hf and
ii) Ni, Cr and one or more elements selected from the group consisting of V, Mn, Sn, Al, Co, Cu, Mo, W, Fe, Si and rare earth elements,
where the atomic ratio of ii) to i) is from about 1.80 to about 1.98.

The present hydrogen storage alloys have improved electrochemical properties, for instance improved low temperature electrochemical performance.

DETAILED DISCLOSURE

The present alloys are for example modified ABx type metal hydride (MH) alloys where in general, A is a hydride forming element and B is a weak or non-hydride forming element. A is in general a larger metallic atom with 4 or less valence electrons and B is in general a smaller metallic atom with 5 or more valence electrons. Suitable ABx alloys include those where x is from about 0.5 to about 5. The present alloys are capable of reversibly absorbing (charging) and desorbing (discharging) hydrogen. For example, present alloys are capable of reversibly absorbing and desorbing hydrogen electrochemically at ambient conditions (25° C. and 1 atm).

ABx type alloys are for example of the categories (with simple examples), AB (HfNi, TiFe, TiNi), $AB_2$ ($ZrMn_2$, $TiFe_2$), $A_2B$ ($Hf_2Fe$, $Mg_2Ni$), $AB_3$ ($NdCo_3$, $GdFe_3$), $A_2B_7$ ($Pr_2Ni_7$, $Ce_2Co_7$) and $AB_5$ ($LaNi_5$, $CeNi_5$).

The present alloys are for example obtained by modifying an ABx type base alloy (one A and one B element chosen) with one or more modifying elements. Modification also includes judicious selection of metals and their atomic ratios and control of processing parameters during solidification, post-solidification processing, annealing, processing or operation of a hydrogen storage alloy. Annealing can be performed in vacuum, partial vacuum, or an inert gas environment followed by a nature, forced air, or quick cooling. Modification also includes activation techniques, such as etching, pre-oxidation, electrodeless and electrical plating and coating. Etching steps may include basic and/or acidic etching processes to selectively or preferentially etch one or more elements or oxides or hydroxides or phases in the interface region of a hydrogen storage alloy.

Prior to use, metal or metal alloy electrodes are typically activated, a process in which native surface oxides in the interface region are removed or reduced. The process of activation may be accomplished via etching, electrical forming, pre-conditioning or other suitable methods for altering surface oxides. Activation may be applied to an electrode alloy powder, a finished electrode or any point in between.

The present alloys may be obtained by employing a combination of the above techniques. Alloys to be modified according to the present invention are "base alloys".

Suitable modifying elements include rare earth elements, Si, Al and V. Rare earth elements are Sc, Y, La and the Lanthanides. Mischmetal (Mm) is included with the term "one or more rare earth elements". The rare earth element is for instance La.

Metal hydride base alloys include alloys containing Ti, V and Mn (Ti—V—Mn alloys) and alloys containing Ti, V and Fe. For instance hydrides of alloys containing from about 31 to about 46 atomic percent Ti, from about 5 to about 33 atomic percent V and from about 36 to about 53 atomic percent Mn and/or Fe. Suitable alloys are taught for instance in U.S. Pat. No. 4,111,689.

Metal hydride base alloys include alloys of formula ABx where A comprises from about 50 to below 100 atomic percent Ti and the remainder is Zr and/or Hf and B comprises from about 30 to below 100 atomic percent of Ni and the remainder is one or more elements selected from Cr, V, Nb, Ta, Mo, Fe, Co, Mn, Cu and rare earths and x is from about 1 to about 3. These alloys are taught for example in U.S. Pat. No. 4,160,014.

Metal hydride base alloys include alloys of formula $(TiV_{2-x}Ni_x)_{1-y}M_y$ where x is from about 0.2 to about 1.0 and M is Al and/or Zr; alloys of formula $Ti_{2-x}Zr_xV_{4-y}Ni_y$ where x is from 0 to about 1.5 and y is from about 0.6 to about 3.5; and alloys of formula $Ti_{1-x}Cr_xV_{2-y}Ni_y$ where x is from 0 to about 0.75 and y is from about 0.2 to about 1.0. These base alloys are disclosed for example in U.S. Pat. No. 4,551,400.

Metal hydride base alloys for example comprise one or more elements selected from the group consisting of Mg, Ti, V, Zr, Nb, La, Si, Ca, Sc and Y and one or more elements selected from the group consisting of Cu, Mn, Fe, Ni, Al, Mo, W, Ti, Re and Co. For instance, MH base alloys may comprise one or more elements selected from Ti, Mg and V and comprise Ni. Advantageously, MH base alloys comprise Ti and Ni, for instance in an atomic range of from about 1:4 to about 4:1. Advantageously, MH base alloys comprise Mg and Ni, for instance in an atomic range of from about 1:2 to about 2:1. Suitable base alloys are disclosed for example in U.S. Pat. No. 4,623,597.

Base alloys include those of formula $(Ti_{2-x}Zr_xV_{4-y}Ni_y)_{1-z}Cr_z$ where x is from 0 to about 1.5, y is from about 0.6 to about 3.5 and z is 0.2. These base alloys are taught for instance in U.S. Pat. No. 4,728,586.

Metal hydride base alloys for instance comprise V, Ti, Zr and Ni (Ti—V—Zr—Ni alloys) or V, Ti, Zr, Ni and Cr. For instance, MH base alloys comprise Ti, V and Ni and one or more elements selected from Cr, Zr and Al. For example, MH base alloys include $V_{22}Ti_{16}Zr_{16}Ni_{39}Cr_7$, $(V_{22}Ti_{16}Zr_{16}N_{39}Cr_7)_{95}Al_5$, $(V_{22}Ti_{16}Zr_{16}N_{39}Cr_7)_{95}Mn_5$, $(V_{22}Ti_{16}Zr_{16}N_{39}Cr_7)_{95}Mo_5$, $(V_{22}Ti_{16}Zr_{16}N_{39}Cr_7)_{95}Cu_5$, $(V_{22}Ti_{16}Zr_{16}N_{39}Cr_7)_{95}W_5$, $(V_{22}Ti_{16}Zr_{16}N_{39}Cr_7)_{95}Fe_5$, $(V_{22}Ti_{16}Zr_{16}N_{39}Cr_7)_{95}Co_5$, $V_{22}Ti_{16}Zr_{16}N_{32}Cr_7Co_7$, $V_{20.6}Ti_{15}Zr_{15}N_{30}Cr_{6.6}Co_{6.6}Mn_{3.6}Al_{2.7}$ and $V_{22}Ti_{16}Zr_{16}N_{27.8}Cr_7Co_{5.9}Mn_{3.1}Al_{2.2}$ alloys. For instance, MH base alloys include alloys of formula $(V_{y'-y}Ni_yTi_{x'-x}Zr_xCr_z)_aM_b$ where y' is from about 3.6 to about 4.4, y is from about 0.6 to about 3.5, x' is from about 1.8 to about 2.2, x is from 0 to about 1.5, z is from 0 to about 1.44, a is from about 70 to about 100, b is from 0 to about 30 and M is one or more elements selected from the group consisting of Al, Mn, Mo, Cu, W, Fe and Co. Values are atomic percent (at %). Suitable MH base alloys are taught for instance in U.S. Pat. No. 5,096,667.

Base alloys include those of formula $(metal\ alloy)_aCo_b\text{-}Mn_cFe_dSn_e$ where (metal alloy) comprises from about 0.1 to about 60 at % Ti, from about 0.1 to about 40 at % Zr, from 0 to about 60 at % V, from about 0.1 to about 57 at % Ni and from 0 to about 56 at % Cr; b is 0 to about 7.5 at %, c is from about 13 to about 17 at %, d is from 0 to about 3.5 at % and e is from 0 to about 1.5 at %, where a+b+c+d+e=100 at %. Suitable MH base alloys are taught for example in U.S. Pat. No. 5,536,591.

Metal hydride base alloys include $LaNi_5$ type alloys, alloys containing Ti and Ni and alloys containing Mg and Ni. Ti and Ni containing alloys may further contain one or more of Zr, V, Cr, Co, Mn, Al, Fe, Mo, La or Mm (mischmetal). Mg and Ni containing alloys may further contain one or more elements selected from Co, Mn, Al, Fe, Cu, Mo, W, Cr, V, Ti, Zr, Sn, Th, Si, Zn, Li, Cd, Na, Pb, La, Mm, Pd, Pt and Ca. Suitable base alloys are taught for instance in U.S. Pat. No. 5,554,456.

Metal hydride base alloys are for example $LaNi_5$ or TiNi based alloys. For example, MH base alloys include one or more hydride forming elements selected from the group consisting of Ti, V and Zr and one or more elements selected from the group consisting of Ni, Cr, Co, Mn, Mo, Nb, Fe, Al, Mg, Cu, Sn, Ag, Zn and Pd. For example, MH base alloys comprise one or more hydride forming elements selected from the group consisting of Sc, Y, La, Ce, Pr, Nd, Sm and Mm and one or more elements selected from the group consisting of Ni, Cr, Co, Mn, Fe, Cu, Sn, Al, Si, B, Mo, V, Nb, Ta, Zn, Zr, Ti, Hf and W. MH base alloys may include one or more elements selected from the group consisting of Al, B, C, Si, P, S, Bi, In and Sb.

Base alloys include $(Mg_xNi_{1-x})_aM_b$ alloys where M is one or more elements selected from the group consisting of Ni, Co, Mn, Al, Fe, Cu, Mo, W, Cr, V, Ti, Zr, Sn, Th, Si, Zn, Li, Cd, Na, Pb, La, Mm, Pd, Pt and Ca; b is from 0 to about 30 atomic percent, a+b=100 atomic percent and x is from about 0.25 to about 0.75.

The base alloys also include hydrides of alloys of formula $ZrMo_dNi_e$ where d is from about 0.1 to about 1.2 and e is from about 1.1 to about 2.5

Base alloys include alloys of formula $ZrMn_wV_xM_yNi_z$ where M is Fe or Co and w is from about 0.4 to about 0.8 at %, x is from about 0.1 to about 0.3 at %, y is from 0 to about 0.2 at %, z is from about 1 to about 1.5 at % and w+x+y+z is from about 2 to about 2.4 at %.

MH base alloys include alloys of formula $LaNi_5$ where La or Ni is substituted by one or more metals selected from periodic groups Ia, II, III, IV and Va other than lanthanides, in an atomic percent from about 0.1 to about 25.

MH base alloys include those of formula $TiV_{2-x}Ni_x$ where x is from about 0.2 to about 0.6.

MH base alloys also include alloys of formula $Ti_aZr_bNi_c\text{-}Cr_dM_x$ where M is one or more elements selected from the group consisting of Al, Si, V, Mn, Fe, Co, Cu, Nb, Ag and Pd, a is from about 0.1 to about 1.4, b is from about 0.1 to about 1.3, c is from about 0.25 to about 1.95, d is from about 0.1 to about 1.4, x is from 0 to about 0.2 and a+b+c+d=about 3.

MH base alloys include alloys of formula $Ti_{1-x}Zr_xMn_{2-y-z}Cr_yV_z$ where x is from about 0.05 to about 0.4, y is from 0 to about 1.0 and z is from 0 to about 0.4.

MH base alloys also include those of formula $LnM_5$ where Ln is one or more lanthanides and M is Ni and/or Co.

Base alloys for example comprise from about 40 to about 75 weight percent of one or more elements selected from periodic groups II, IV and V and one or more metals selected from the group consisting of Ni, Cu, Ag, Fe and Cr—Ni steel.

MH base alloys may also comprise a main texture Mm-Ni system. Base alloys suitable for modification are taught for instance in U.S. Pat. No. 5,840,440.

Metal hydride base alloys for instance comprise V, Ti, Zr, Ni, Cr and Mn. For instance, MH base alloys comprise V, Ti, Zr, Ni, Cr, Mn and Al; V, Ti, Zr, Ni, Cr, Mn and Sn; V, Ti, Zr, Ni, Cr, Mn and Co; V, Ti, Zr, Ni, Cr, Mn, Al, Sn and Co; or comprise V, Ti, Zr, Ni, Cr, Mn, Al, Sn, Co and Fe. MH base alloys include alloys of formula $(metal\ alloy)_a\ Co_bFe_cAl_dSn_e$ where (metal alloy) comprises from about 0.1 to about 60 at % Ti, from about 0.1 to about 40 at % Zr, from 0 to about 60 at % V, from about 0.1 to about 57 at % Ni, from about 5 to about 22 at % Mn and from 0 to 56 at % Cr, b is from about 0.1 to about 10 at %, c is from 0 to about 3.5 at %, d is from about 0.1 to about 10 at %, e is from about 0.1 to about 3 at % and a+b+c+d+e=100 at %. Suitable MH base alloys are taught for example in U.S. Pat. No. 6,270,719.

Metal hydride base alloys include one or more alloys selected from the group consisting of AB, $AB_2$, $AB_5$ and $A_2B$ type alloys where A and B may be transition metals, rare earths or combinations thereof where component A generally has a stronger tendency to form hydrides than component B. In AB hydrogen storage base alloys, A for instance comprises one or more elements selected from the group consisting of Ti, Zr and V and B comprises one or more elements selected from the group consisting of Ni, V, Cr, Co, Mn, Mo, Nb, Al, Mg, Ag, Zn and Pd. AB base alloys include ZrNi, ZrCo, TiNi, TiCo and modified forms thereof. $A_2B$ type base alloys include $Mg_2Ni$ and modified forms thereof according to Ovshinsky principles where either or both of Mg and Ni are wholly or partially replaced by a multi-orbital modifier. $AB_2$ type base alloys are Laves phase compounds and include alloys where A comprises one or more elements selected from the group consisting of Zr and Ti and B comprises one or more elements selected from the group consisting of Ni, V, Cr, Mn, Co, Mo, Ta and Nb. $AB_2$ type base alloys include alloys modified according to the Ovshinsky principles. $AB_5$ metal hydride base alloys include those where A comprises one or more elements selected from the group consisting of lanthanides and B comprises one or more transition metals. Included are $LaNi_5$ and $LaNi_5$ where Ni is partially replaced by one or more elements selected from the group consisting of Mn, Co, Al, Cr, Ag, Pd, Rh, Sb, V and Pt and/or where La is partially replaced by one or more elements selected from the group consisting of Ce, Pr, Nd, other rare earths and Mm. Included also are $AB_5$ type base alloys modified according to the Ovshinsky principles. Such base alloys are taught for instance in U.S. Pat. No. 6,830,725.

Base alloys include $TiMn_2$ type alloys. For instance metal hydride base alloys comprise Zr, Ti, V, Cr, and Mn where Zr is from about 2 to about 5 at %, Ti is from about 26 to about 33 at %, V is from about 7 to about 13 at %, Cr is from about 8 to about 20 at % and Mn is from about 36 to about 42 at %. These alloys may further include one or more elements selected from the group consisting of Ni, Fe and Al, for instance from about 1 to about 6 at % Ni, from about 2 to about 6 at % Fe and from about 0.1 to about 2 at % Al. These base alloys may also contain up to about 1 at % Mm. Alloys suitable for modification include $Zr_{3.63}Ti_{29.8}V_{8.82}Cr_{9.85}Mn_{39.5}Ni_{2.0}Fe_{5.0}Al_{1.0}Mm_{0.4}$; $Zr_{3.6}Ti_{29.0}V_{8.9}Cr_{10.1}Mn_{40.1}Ni_{2.0}Fe_{5.1}Al_{1.2}$; $Zr_{3.6}Ti_{28.3}V_{8.8}Cr_{10.0}Mn_{40.7}Ni_{1.9}Fe_{5.1}Al_{1.6}$ and $Zr_1Ti_{33}V_{12.54}Cr_{15}Mn_{36}Fe_{2.25}Al_{0.21}$. Suitable base alloys are taught for example in U.S. Pat. No. 6,536,487.

Metal hydride base alloys may comprise 40 at % or more of $A_5B_{19}$ type structures of formula $La_aR_{1-a-b}Mg_bNi_{c-d-e}$ where $0 \le a \le 0.5$ at %, $0.1 \le b \le 0.2$ at %, $3.7 \le c \le 3.9$ at %, $0.1 \le d \le 0.3$ and $0 \le d \le 0.2$. Suitable base alloys are taught for instance in U.S. Pat. No. 7,829,220.

The alloys of this invention may be in the form of hydrogen-absorbing alloy particles containing at least Ni and a rare earth. The particles may have a surface layer and an interior where the surface layer has a nickel content greater than that of the interior and nickel particles having a size of from about 10 nm to about 50 nm are present in the surface layer. Metal hydride base alloys may be of formula $Ln_{1-x}Mg_xNi_{a-b-c}Al_bZ_c$, where Ln is one or more rare earth elements, Z is one or more of Zr, V, Bn, Ta, Cr, Mo, Mn, Fe, Co, Ga, Zn, Sn, In, Cu, Si, P and B, $0.05 \le x \le 0.3$ at %, $2.8 \le a \le 3.9$ at %, $0.05 \le b \le 0.25$ at % and $0.01 \le c \le 0.25$. Suitable base alloys are taught for example in U.S. Pat. No. 8,053,114.

The alloys of this invention may comprise a crystalline structure having multiple phases containing at least an $A_2B_7$ type structure and an $A_5B_{19}$ type structure and a surface layer having a nickel content greater than that of the bulk. Metal hydride base alloys include alloys of formula $Ln_{1-x}Mg_xNi_{y-a-b}Al_aM_b$, where Ln is one or more rare earths including Y, M is one or more of Co, Mn and Zn, where $0.1 \le x \le 0.2$ at %, $3.5 \le y \le 3.9$ at %, $0.1 \le a \le 0.3$ at % and $0 \le b \le 0.2$. Suitable base alloys are disclosed for example in U.S. Pat. No. 8,124,281.

Metal hydride base alloys may be of formula $Ln_{1-x}Mg_x(Ni_{1-y}T_y)_z$ where Ln is one or more elements selected from lanthanide elements, Ca, Sr, Sc, Y, Ti, Zr and Hf, T is one or more elements selected from V, Nb, Ta, Cr, Mo, Mn, Fe, Co, Al, Ga, Zn, Sn, In, Cu, Si, P and B and where $0 < x \le 1$ at %, $0 \le y \le 0.5$ at %, and $2.5 \le z \le 4.5$ at %. Suitable base alloys are taught for instance in U.S. Pat. No. 8,257,862.

The alloys of this invention may comprise La, Nd, Mg, Ni and Al; La, Nd, Mg, Ni, Al and Co; La, Pr, Nd, Mg, Ni and Al or La, Ce, Pr, Nd, Ni, Al, Co and Mn as taught in U.S. Pat. No. 8,409,753.

Metal hydride base alloys may be of formula $Ti_AZr_{B-X}Y_XV_CNi_DM_E$ where A, B, C and D are each greater than 0 and less than or equal to 50 at %, X is greater than 0 and less than or equal to 4 at %, M is one or more metals selected from Co, Cr, Sn, Al and Mn and E is from 0 to 30 at %. Suitable base alloys are taught for example in U.S. Pub. No. 2013/0277607.

The alloys of this invention include modified $A_2B_7$ type hydrogen storage alloys. For instance, the MH base alloys may be $A_xB_y$ alloys where A includes at least one rare earth element and also includes Mg; B includes at least Ni and the atomic ratio x to y is from about 1:2 to about 1:5, for instance about 1:3 to about 1:4. MH base alloys may further comprise one or more elements selected from the group consisting of B, Co, Cu, Fe, Cr and Mn. The atomic ratio of Ni to the further elements may be from about 50:1 to about 200:1. The rare earths include La, Ce, Nd, Pr and Mm. The atomic ratio of rare earths to Mg may be from about 5:1 to about 6:1. The B elements may further include Al where the atomic ratio of Ni to Al may be from about 30:1 to about 40:1.

Metal hydride base alloys include ABx high capacity hydrogen storage alloys where x is from about 0.5 to about 5 and which has a discharge capacity of $\ge 400$ mAh/g, $\ge 425$ mAh/g, $\ge 450$ mAh/g or $\ge 475$ mAh/g.

Metal hydride base alloys include high capacity MH alloys containing magnesium (Mg), for example an AB, $AB_2$ or $A_2B$ type alloy containing Mg and Ni. For instance, MH base alloys include MgNi, $MgNi_2$ and $Mg_2Ni$. Such Mg and Ni containing alloys may further comprise one or more elements selected from the group consisting of rare earth elements and transition metals. For instance, alloys containing Mg and Ni may further comprise one or more elements selected from the group consisting of Co, Mn, Al, Fe, Cu, Mo, W, Cr, V, Ti, Zr, Sn, Th, Si, Zn, Li, Cd, Na, Pb, La, Ce, Pr, Nd, Mm, Pd, Pt, Nb, Sc and Ca.

For instance, MH base alloys comprise Mg and Ni and optionally one or more elements selected from the group consisting of Co, Mn, Al, Fe, Cu, Mo, W, Cr, V, Ti, Zr, Sn, Th, Si, Zn, Li, Cd, Na, Pb, La, Ce, Pr, Nd, Mm, Pd, Pt, Nb, Sc and Ca.

Mm is "mischmetal". Mischmetal is a mixture of rare earth elements. For instance, Mm is a mixture containing La, Nd and Pr, for instance containing Ce, La, Nd and Pr.

For example, MH base alloys include MgNi, $Mg_{0.8}Ti_{0.2}Ni$, $Mg_{0.7}Ti_{0.3}Ni$, $Mg_{0.9}Ti_{0.1}Ni$, $Mg_{0.8}Zr_{0.2}Ni$, $Mg_{0.7}Ti_{0.225}La_{0.075}Ni$, $Mg_{0.8}Al_{0.2}Ni$, $Mg_{0.9}Ti_{0.1}Ni$, $Mg_{0.9}Ti_{0.1}NiAl_{0.05}$, $Mg_{0.08}Pd_{0.2}Ni$, $Mg_{0.09}Ti_{0.1}NiAl_{0.05}$, $Mg_{0.09}Ti_{0.1}NiAl_{0.05}Pd_{0.1}$, $Mg_{50}Ni_{45}Pd_5$, $Mg_{0.85}Ti_{0.15}Ni_{1.0}$, $Mg_{0.95}Ti_{0.15}Ni_{0.9}$, $Mg_2Ni$, $Mg_{2.0}Ni_{0.6}Co_{0.4}$, $Mg_2Ni_{0.6}Mn_{0.4}$, $Mg_2Ni_{0.7}Cu_{0.3}$, $Mg_{0.8}La_{0.2}Ni$, $Mg_{2.0}Co_{0.1}Ni$, $Mg_{2.1}Cr_{0.1}Ni$, $Mg_{2.0}Nb_{0.1}Ni$, $Mg_{2.0}Ti_{0.1}Ni$, $Mg_{2.0}V_{0.1}Ni$, $Mg_{1.3}Al_{0.7}Ni$, $Mg_{1.5}Ti_{0.5}Ni$, $Mg_{1.5}Ti_{0.3}Zr_{0.1}Al_{0.1}Ni$, $Mg_{1.75}Al_{0.25}Ni$ and $(MgAl)_2Ni$, $Mg_{1.70}Al_{0.3}Ni$.

For example, MH base alloys include alloys of Mg and Ni in an atomic ratio of from about 1:2 to about 2:1 further comprising one or more elements selected from the group consisting of Co, Mn, Al, Fe, Cu, Mo, W, Cr, V, Ti, Zr, Sn, Th, Si, Zn, Li, Cd, Na, Pb, La, Ce, Pr, Nd, Mm, Pd, Pt, Nb, Sc and Ca. The further element or elements may be present from about 0.1 to about 30 atomic percent (at %) or from about 0.25 to about 15 at % or from about 0.5, about 1, about 2, about 3, about 4 or about 5 at % to about 15 at %, based on the total alloy. The atomic ratio of Mg to Ni is for instance about 1:1. Thus, Mg and Ni together may be present from about 70 at % to about 99.9 at % based on the total alloy. Mg—Ni MH base alloys may be free of further elements where Mg and Ni together are present at 100 at %.

Metal hydride base alloys may comprise Mg and Ni in an atomic ratio of from about 1:2 to about 2:1 where Mg and Ni together are present at a level of $\geq 70$ at %, based on the total alloy.

Metal hydride base alloys may comprise $\geq 20$ at % Mg.

Metal hydride base alloys may comprise Mg and Ni in an atomic ratio of from about 1:2 to about 2:1 and further comprise Co and/or Mn. The alloys of this invention include modified $Mg_{52}Ni_{39}Co_6Mn_3$ or modified $Mg_{52}Ni_{39}Co_3Mn_6$.

Metal hydride base alloys may contain $\geq 90$ weight % Mg and one or more additional elements. The one or more additional elements may be selected from the group consisting of Ni, Mm, Al, Y and Si. These alloys may contain for example from about 0.5 to about 2.5 weight % Ni and about 1.0 to about 4.0 weight % Mm. These alloys may also contain from about 3 to about 7 weight % Al and/or from about 0.1 to about 1.5 weight % Y and/or from about 0.3 to about 1.5 weight % Si.

Suitable high capacity MH base alloys are disclosed for example in U.S. Pat. Nos. 5,506,069, 5,616,432 and 6,193,929.

The alloys of this invention for instance may be capable of storing at least 6 weight % hydrogen and/or absorbing at least 80% of the full storage capacity of hydrogen in under 5 minutes at 300° C.; or may be capable of storing at least 6.5 weight % of hydrogen and/or absorbing 80% of the full storage capacity of hydrogen in under 2 minutes at 300° C.; or may be capable of storing at least 6.9 weight % of hydrogen and/or capable of absorbing 80% of the full storage capacity of hydrogen in under 1.5 minutes at 300° C.

Metal hydride base alloys include alloys of formula $Ti_aZr_{b-x}Y_xV_cNi_dM_e$ where each of a, b, c and d are greater than 0 and less than or equal to 50 at %, x is greater than 0 and less than or equal to 4 at %, M is one or more metals selected from the group consisting of Co, Cr, Sn, Al and Mn and e is from 0 to about 30 at %. These alloys are disclosed for example in U.S. Pub. No. 2013/0277607.

The present alloys may be prepared for instance via arc melting or induction melting under an inert atmosphere, by melt casting, rapid solidification, mechanical alloying, sputtering or gas atomization or other methods as taught in the above references.

Unless otherwise stated, amounts of elements in alloys or phases are in atomic percent (at %), based on the total alloy or phase.

Unless otherwise stated, amounts of individual phases are reported in weight percent (wt %), based on the total alloy.

The low temperature electrochemical performance may be defined as surface catalytic ability at low temperature, for example −40° C. Surface catalytic ability is defined as the product of charge transfer resistance (R) and double layer capacitance (C), R·C. The R and C values are calculated from the curve-fitting of the Cole-Cole plot of AC impedance measurements.

Alternatively, low temperature electrochemical performance may be defined by the charge transfer resistance (R) at −40° C.

Low temperature is defined for example at <25° C., $\leq 10°$ C., $\leq 0°$ C., $\leq -10°$ C., $\leq -20°$ C. or $\leq -30°$ C.

Charge transfer resistance (R) is measured in $\Omega \cdot g$. Double layer capacitance (C) is measured in Farad/g (F/g).

AC impedance measurements are conducted using a SOLARTRON 1250 Frequency Response Analyzer with sine wave of amplitude 10 mV and frequency range of 10 mHz to 10 kHz. Prior to the measurements, the electrodes are subjected to one full charge/discharge cycle at C/10 rate using a SOLARTRON 1470 Cell Test galvanostat, then recharged to 100% state-of-charge (SOC), subsequently discharged to 80% (SOC) and finally cooled to −40° C. Two more cycles are performed at room temperature and the −40° C. AC impedance measurement is repeated.

It has been found that the ratio of two different secondary phases can be advantageously optimized by adjusting the stoichiometry of an ABx alloy. For instance, the present alloys are $AB_2$ type alloys modified with low levels of a rare earth element and designed such that the B/A ratio would be below 2.0.

The surface catalytic ability at −40° C. of present alloys is improved for example by at least 10%, relative to a comparative $AB_2$ alloy, for instance the $AB_2$ alloy $Ti_{12.0}Zr_{21.5}V_{10.0}Cr_{7.5}Mn_{8.1}Ni_{32.2}Sn_{0.3}Al_{0.4}Co_{8.0}$. For example, the surface catalytic ability at −40° C. is improved by at least 15%, at least 20%, at least 25%, at least 30%, at least 35% or at least 40% relative to the a comparative $AB_2$ alloy such as $Ti_{12.0}Zr_{21.5}V_{10.0}Cr_{7.5}Mn_{8.1}Ni_{32.2}Sn_{0.3}Al_{0.4}Co_{8.0}$. Details for measurement are provided in the Examples. The $AB_2$ alloy $Ti_{12.0}Zr_{21.5}V_{10.0}Cr_{7.5}Mn_{8.1}Ni_{32.2}Sn_{0.3}Al_{0.4}Co_{8.0}$ is prepared in the present Examples.

The surface catalytic ability at −40° C. for the present alloys is for example $\leq 30$, $\leq 25$, $\leq 20$, $\leq 15$, $\leq 12 \leq 10.0$, $\leq 9.0$, $\leq 8.0$, $\leq 7.0$, $\leq 6.0$ or $\leq 5.0$ seconds.

For instance, the surface catalytic ability at −40° C. for the alloys is from about 5 to about 10, from about 5 to about 9, from about 5 to about 8 or from about 5 to about 7 seconds.

The charge transfer resistance (R) at −40° C. is for example $\leq 60$, $\leq 55$, $\leq 50$, $\leq 45$, $\leq 40$, $\leq 37$, $\leq 35$, $\leq 30$, $\leq 28$, $\leq 26$, $\leq 24$, $\leq 22$, $\leq 20$, $\leq 18$, $\leq 16$ or $\leq 15$ $\Omega \cdot g$.

For instance, the charge transfer resistance (R) at −40° C. is from about 10 to about 20, from about 13 to about 28, from about 14 to about 26, from about 15 to about 25 or from about 15 to about 24 $\Omega \cdot g$.

The alloys contain at least one main phase and at least one secondary phase. The at least one main phase, the storage secondary phase and the catalytic secondary phase are each of different chemical composition and/or physical structure. Physical structures are crystalline and non-crystalline structures. Phase abundances may be determined by X-ray diffractometry (XRD). Phase compositions may be determined with a scanning electron microscope (SEM) equipped with energy dispersive spectroscopy (EDS).

The main phase or phases in total are present at a higher abundance by weight than each of the secondary phases. The main phase or phases are in general ABx phases, for instance AB, $AB_2$, $AB_3$, $A_2B_7$ or $AB_5$ phases.

Advantageously, the structure of each phase is different. That is, each phase has a structure selected from the group consisting of crystalline structures and non-crystalline (amorphous) structures and where each is different.

The present hydrogen storage alloys are for instance modified ABx type alloys where x is from about 0.5 to about 5.

For example, the present alloys are modified $AB_2$ type alloys where the atomic ratio of ii) to i) is from about 1.80 to about 2.20. The ii) to i) atomic ratio may advantageously be from about 1.80 to about 1.98, from about 1.80 to about 1.95 or from about 1.82 to about 1.93.

The present ii) to i) atomic ratio is for instance about 1.80, about 1.81, about 1.82, about 1.83, about 1.84, about 1.85, about 1.86, about 1.87, about 1.88, about 1.89, about 1.90, about 1.91, about 1.92, about 1.93, about 1.94, about 1.95, about 1.97, about 1.98 or about 1.99.

Present modified $AB_2$ type alloys contain for instance C14 or C15 main Laves phases or contain C14 and C15 main Laves phases. The C14 phase weight abundance is for instance from about 70 to about 95, for instance from about 80 to about 90 or from about 83 to about 88. The C15 phase abundance is for instance from about 2 to about 20, from about 3 to about 15 or from about 3 to 13 by weight, based on the alloy.

For example, the present alloys contain C14 or C15 main Laves phases or contain C14 and C15 main Laves phases and where the catalytic secondary phase and storage secondary phases are non-Laves phases.

The catalytic secondary phase weight abundance is for instance from about 1 to about 40, for instance from about 3 to about 20. The catalytic secondary phase abundance may be about 4, about 5, about 6, about 7, about 8, about 9 or about 10 by weight, based on the alloy.

The storage secondary phase weight abundance is for example from 0 to about 13.3, for example is >0 and ≤13.3, for example from about 0.1 to about 13.3, from about 0.1 to about 10, from about 0.1 to about 7 or from about 0.1 to about 5. The first secondary phase abundance may be about 0.5, about 0.8, about 1.1, about 1.4, about 1.7, about 2.0 or about 2.3 and levels in between, by weight based on the alloy.

Advantageously, the alloys comprise from about 2 wt % to about 10 wt %, from about 3 wt % to about 9 wt % or from about 3 wt % to about 8 wt % of a catalytic secondary phase comprising Ti and Ni and from 0 to about 2 wt %, from about 0.01 wt % to about 1.5 wt % or from about 0.05 wt % to about 1.3 wt % storage secondary phase comprising Y and Ni, based on the total alloy.

In general, within a series of alloys of similar composition, as the weight ratio of the catalytic secondary phase abundance to the storage secondary phase abundance increases, the low temperature electrochemical performance increases. The weight ratio of the catalytic secondary phase abundance to the storage secondary phase abundance is advantageously ≥3 or ≥4, for example ≥5, ≥6 or ≥7. This is when both the storage and catalytic secondary phases are present.

Advantageously, the weight ratio of the catalytic secondary phase to the storage secondary phase is from about 3 to about 10, from about 3 to about 9, from 3 to about 8, from about 4 to about 10, from about 4 to about 9 or from about 4 to about 8.

The catalytic secondary phase advantageously has a TiNi (B2) crystal structure. That is, the crystal structure of the catalytic secondary phase advantageously is the known TiNi (B2) crystal structure as determined by X-ray diffractometry (XRD). To have the known TiNi (B2) crystal structure, the catalytic secondary phase need not contain Ti and/or Ni.

The catalytic secondary phase may comprise Ti and/or Ni.

The catalytic secondary phase for instance contains one or more elements selected from the group consisting of Ti, Zr, Nb and Hf and also comprises Ni. The catalytic secondary phase for instance comprises Ti and Ni or comprises Ti, Zr and Ni.

The catalytic secondary phase comprises for instance from about 13 to about 45 at % Ti, from about 15 to about 30 at % Ti or from about 15 to about 25 at % Ti.

The catalytic secondary phase comprises for instance from about 5 to about 30 at % Zr, from about 15 to about 28 at % Zr or from about 20 to about 26 at % Zr.

The catalytic secondary phase for instance comprises from about 38 to about 60 at % Ni, from about 40 to about 55 at % Ni or from about 45 to about 50 at % Ni.

The crystal structures of present catalytic secondary phases containing the above levels of Ti and Ni are the known TiNi (B2) crystal structure, although they may contain significant amounts of other metals such as Zr which is soluble in the TiNi phase.

For example the catalytic secondary phase contains from about 45 to about 49 at % Ni, from about 17 to about 22 at % Ti and from about 20 to about 24 at % Zr where (Ti+Zr) is from about 41 to about 43 at %. Advantageously, the at % of Zr is ≥ the at % of Ti when present together in the catalytic secondary phase. For instance the at % of Zr is > the at % of Ti when present together in a catalytic secondary phase.

The storage secondary phase for instance has a structure different from that of the catalytic secondary phase.

The storage secondary phase for instance comprises one or more rare earth elements. The storage secondary phase for instance comprises Ni, comprises one or more rare earth elements and Ni, comprises one or more rare earth elements, Ni and Sn, comprises Y and Ni or comprises Y, Ni and Sn.

For example, the storage secondary phase comprises from about 15 to about 55 at %, from about 20 to about 50 at %, from about 25 to about 45 at % or from about 30 to about 40 at % one or more rare earth elements. For example, the storage secondary phase comprises from about 30 to about 50 at % or from about 30 to about 40 at % one or more rare earth elements. The rare earth element is for instance Y.

The storage secondary phase for instance comprises from about 15 to about 50 at % Ni, from about 20 to about 40 at % Ni or from about 20 to about 30 at % Ni.

The storage secondary phase for example may comprise from about 15 to about 32 at % Sn, from about 18 to about 30 at % Sn or from about 20 to about 29 at % Sn.

For example, the storage secondary phase contains from about 32 to about 38 at % Y, from about 21 to about 27 at % Ni and from about 20 to about 28 at % Sn.

Without being bound by theory, it is thought that the secondary storage phase is capable of reversibly charging and discharging hydrogen, as is the main (storage) phase, while the secondary catalytic phase "catalytic phase" acts to aid the main and/or storage phases in this reversible reaction.

It is believed the different phases are working together synergistically. It may be that one having a weaker metal-hydrogen bond will act as a catalyst while the other acts as a hydrogen storage phase. With facilitation from the catalytic phase, the hydrogen in the storage phase(s) may be more easily removed.

The secondary storage phase is optional—the present modified alloys containing at least the catalytic secondary phase also exhibit outstanding electrochemical properties.

For instance, where the modification is performed via addition of low levels of certain elements, these elements may be in solid solution in the main phase rather than forming an additional detectable storage phase.

The present "modification" promotes the formation of the catalytic phase.

Atomic percents (at %) discussed herein regarding individual phases means based on the phase.

Atomic percents (at %) discussed herein regarding the alloy means based on the total alloy.

Rare earth elements are Sc, Y, La and the Lanthanides. Mischmetal (Mm) is included with the term "one or more rare earth elements". The rare earth element is for instance Y.

The present alloys contain for instance from about 0.05 at % to about 10.0 at % of one or more rare earth elements or from about 0.1 at % to about 7.0 at %, from about 0.2 at % to about 5.0 at % or from about 0.2 at % to about 2.0 at % of one or more rare earth elements, based on the alloy.

The present alloys may advantageously contain about 0.05 at %, about 0.1 at %, about 0.15 at %, about 0.20 at %, about 0.25 at %, about 0.30 at %, about 0.35 at %, about 0.40 at %, about 0.45 at %, about 0.50 at %, about 0.55 at %, about 0.60 at %, about 0.65 at %, about 0.70 at %, about 0.75 at %, about 0.80 at %, about 0.85 at %, about 0.90 at %, about 0.95 at % or about 0.98 at % of one or more rare earth elements, based on the alloy, and levels in between.

The present alloys contain for example Ti, Zr, V, Ni and one or more rare earth elements. The present alloys may contain Ti, Zr, Ni, Mn and one or more rare earth elements. The present alloys may contain Ti, Cr, V, Ni and one or more rare earth elements.

The present alloys contain for example Ti, Zr, V, Ni, one or more rare earth elements and one or more elements selected from the group consisting of Cr, Mn and Al. The alloys for instance contain Ti, Zr, V, Ni, Cr, Mn, Sn, Al, Co and one or more rare earth elements. For instance, present alloys contain Ti, Zr, V, Ni, Cr, Mn, Sn, Al, Co and Y.

For instance, the present alloys comprise about 0.1 to about 60% Ti, about 0.1 to about 40% Zr, 0<V<60%, 0 to about 56% Cr, about 5 to about 22% Mn, about 0.1 to about 57% Ni, about 0.1 to about 3% Sn, about 0.1 to about 10% Al, about 0.1 to about 11% Co and about 0.1 to about 10% one or more rare earth elements, where the percents are atomic % and in total equal 100%.

Also disclosed are alloys comprising about 5 to about 15% Ti, about 18 to about 29% Zr, about 3.0 to about 13% V, about 1 to about 10% Cr, about 6 to about 18% Mn, about 29 to about 41% Ni, about 0.1 to about 1% Sn, about 0.1 to about 0.7% Al, about 2 to about 11% Co and about 0.2 to about 5% one or more rare earth elements, where the percents are atomic % and in total equal 100%.

Advantageously, the alloys comprise about 11% to about 13% Ti, about 21 to about 23% Zr, about 9 to about 11% V, about 6 to about 9% Cr, about 6 to about 8% Mn, about 31 to about 34% Ni, about 0.2 to about 0.4% Sn, about 0.3 to about 0.6% Al, about 2 to about 8% Co and about 0.2 to about 2.0% one or more rare earth elements, where the percents are atomic % and in total equal 100%.

The present alloys are capable of reversibly absorbing and desorbing hydrogen for example at 25° C., at 0° C., at −20° C. and/or at −40° C.

Also subject of the invention is a metal hydride battery, an alkaline fuel cell or a metal hydride air battery comprising an electrode comprising a present hydrogen storage alloy.

Further subject of the present invention is a metal hydride battery comprising at least one anode capable of reversibly charging and discharging hydrogen, at least one cathode capable of reversible oxidation, a casing having said anode and cathode positioned therein, a separator separating the cathode and the anode and an electrolyte in contact with both the anode and the cathode, where the anode comprises a present hydrogen storage alloy.

The present battery is capable of charging a large amount of hydrogen under one polarity and discharging a desired amount of hydrogen under the opposite polarity.

Also subject of the invention is an alkaline fuel cell comprising at least one hydrogen electrode, at least one oxygen electrode and at least one gas diffusion material, where the hydrogen electrode comprises a present hydrogen storage alloy.

Also subject of the invention is a metal hydride air battery comprising at least one air permeable cathode, at least one anode, at least one air inlet and an electrolyte in contact with both the anode and the cathode, where the anode comprises a present hydrogen storage alloy.

The terms "a" or "an" referring to elements of an embodiment may mean "one" or may mean "one or more".

The term "about" refers to variation that can occur, for example, through typical measuring and handling procedures; through inadvertent error in these procedures; through differences in the manufacture, source, or purity of ingredients used; through differences in methods used; and the like. The term "about" also encompasses amounts that differ due to different equilibrium conditions for a composition resulting from a particular initial mixture. Whether or not modified by the term "about," embodiments and claims include equivalents to the recited quantities.

All numeric values herein are modified by the term "about," whether or not explicitly indicated. The term "about" generally refers to a range of numbers that one of skill in the art would consider equivalent to the recited value (i.e., having the same function and/or result). In many instances, the term "about" may include numbers that are rounded to the nearest significant figure.

A value modified by the term "about" of course includes the specific value. For instance, "about 5.0" must include 5.0.

The term "consisting essentially of" means that the composition, method or structure may include additional ingredients, steps and/or parts, but only if the additional ingredients, steps and/or parts do not materially alter the basic and novel characteristics of the claimed composition, method or structure.

U.S. Patents, U.S. published patent applications and U.S. patent applications discussed herein are each hereby incorporated by reference.

Following are some embodiments of the invention.

E1. A hydrogen storage alloy, for example having improved low temperature electrochemical properties, comprising
a) at least one main phase,
b) a storage secondary phase and
c) a catalytic secondary phase,
where the weight ratio of the catalytic secondary phase abundance to the storage secondary phase abundance is ≥3, ≥4, ≥5, ≥6 or ≥7 or where the weight ratio of the catalytic secondary phase abundance to the storage secondary phase abundance is from about 3 to about 10, from about 3 to about 9, from about 3 to about 8, from about 4 to about 10, from 4 to about 9 or from 4 to about 8;
where the main phase or phases in total are present at a higher abundance by weight than each of the secondary phases and where the main phase or phases are for example ABx phases, for instance AB, $AB_2$, $AB_3$, $A_2B_7$ or $AB_5$ phases;

for example where the secondary catalytic phase catalyzes reversible electrochemical hydrogen charge/discharge reaction in the main and/or storage phases.

E2. An alloy according to embodiment 1 comprising
i) one or more elements selected from the group consisting of A type elements and
ii) one or more elements selected from the group consisting of B type elements and rare earth elements;
for example
i) one or more elements selected from the group consisting of Ti, Zr, Nb and Hf and
ii) one or more elements selected from the group consisting of V, Cr, Mn, Ni, Sn, Al, Co, Cu, Mo, W, Fe, Si and rare earth elements; or
i) one or more elements selected from the group consisting of Ti, Zr, Nb and Hf and
ii) Ni, Cr and one or more elements selected from the group consisting of B, Al, Si, Sn, other transition metals and rare earth elements; or
i) one or more elements selected from the group consisting of Ti, Zr, Nb and Hf and
ii) Ni, Cr and one or more elements selected from the group consisting of V, Mn, Sn, Al, Co, Cu, Mo, W, Fe, Si and rare earth elements,
where the atomic ratio of ii) to i) is from about 1.80 to about 2.20.

E3. An alloy according to embodiment 2 where the atomic ratio of ii) to i) is from about 1.80 to about 1.98, from about 1.80 to about 1.95 or from about 1.82 to about 1.93; or is about 1.80, about 1.81, about 1.82, about 1.83, about 1.84, about 1.85, about 1.86, about 1.87, about 1.88, about 1.89, about 1.90, about 1.91, about 1.92, about 1.93, about 1.94, about 1.95, about 1.97, about 1.98 or about 1.99.

E4. An alloy according to any of the preceding embodiments comprising C14 and C15 main Laves phases where the C14 phase weight abundance is from about 70 to about 95, from about 80 to about 90 or from about 83 to 88 and the C15 phase abundance is from about 2 to about 20, from about 3 to about 15 or from about 3 to 13 by weight, based on the alloy.

E5. An alloy according to any of the preceding embodiments where the catalytic secondary phase has a TiNi (B2) crystal structure.

E6. An alloy according to any of the preceding embodiments where the catalytic secondary phase comprises one or more elements selected from the group consisting of Ti, Zr, Nb and Hf and also comprises Ni.

E7. An alloy according to any of the preceding embodiments where the catalytic secondary phase comprises from about 13 to about 45 at % Ti, from about 15 to about 30 at % Ti or from about 15 to about 25 at % Ti, from about 5 to about 30 at % Zr, from about 15 to about 28 at % Zr or from about 20 to about 26 at % Zr and from about 38 to about 60 at % Ni, from about 40 to about 55 at % Ni or from about 45 to about 50 at % Ni.

E8. An alloy according to any of the preceding embodiments where the catalytic secondary phase abundance is ≥3 and ≤40 wt %; or the catalytic secondary phase weight abundance is from about 1 to about 40, from about 3 to about 20 or about 4, about 5, about 6, about 7, about 8, about 9 or about 10 by weight, based on the alloy.

E9. An alloy according to any of the preceding embodiments where the storage secondary phase comprises one or more rare earth elements; comprises Ni; comprises one or more rare earth elements and Ni; comprises one or more rare earth elements, Ni and Sn; comprises Y and Ni or comprises Y, Ni and Sn.

E10. An alloy according to any of the preceding embodiments where the storage secondary phase comprises from about 15 to about 55 at %, from about 20 to about 50 at %, from about 25 to about 45 at % or from about 30 to about 40 at % one or more rare earth elements; or the storage secondary phase comprises from about 30 to about 50 at % or from about 30 to about 40 at % one or more rare earth elements; and where the storage secondary phase comprises from about 15 to about 50 at % Ni, from about 20 to about 40 at % Ni or from about 20 to about 30 at % Ni.

E11. An alloy according to any of the preceding embodiments where the storage secondary phase comprises from about 15 to about 32 at % Sn, from about 18 to about 30 at % Sn or from about 20 to about 29 at % Sn.

E12. An alloy according to any of the preceding embodiments where the storage secondary phase comprises from about 32 to about 38 at % Y, from about 21 to about 27 at % Ni and from about 20 to about 25 at % Sn.

E13. An alloy according to any of the preceding embodiments where the storage secondary phase abundance is ≤13.3 wt %; or from about 0.1 to about 13.3, from about 0.1 to about 12, from about 0.1 to about 11, from about 0.1 to about 10, from about 0.1 to about 7 or from about 0.1 to about 5; or about 0.5, about 0.8, about 1.1, about 1.4, about 1.7, about 2.0 or about 2.3 and levels in between, by weight based on the alloy.

E14. An alloy according to any of the preceding embodiments comprising from about 2 wt % to about 10 wt %, from about 3 wt % to about 9 wt % or from about 3 wt % to about 8 wt % of a catalytic secondary phase comprising Ti and Ni and from 0 to about 2 wt %, from about 0.01 wt % to about 1.5 wt % or from about 0.05 wt % to about 1.3 wt % of a storage secondary phase comprising Y and Ni, based on the total alloy.

E15. An alloy according to any of the preceding embodiments where the weight ratio of the catalytic secondary phase abundance to the storage secondary phase abundance is ≥4 or where the weight ratio of the catalytic secondary phase abundance to the storage secondary phase abundance is from about from about 4 to about 10, from 4 to about 9 or from 4 to about 8.

E16. An alloy according to any of the preceding embodiments
comprising Ti, Zr, V, Ni and one or more rare earth elements; or
comprising Ti, Zr, Ni, Mn and one or more rare earth elements; or
comprising Ti, Cr, V, Ni and one or more rare earth elements; or
comprising Ti, Zr, V, Ni, one or more rare earth elements and one or more elements selected from the group consisting of Cr, Mn, Sn, Al, Cu, Mo, W, Fe, Si and Co; or
comprising Ti, Zr, V, Ni, Cr and one or more elements selected from the group consisting of B, Al, Si, Sn and other transition metals; or
comprising Ti, Zr, V, Ni, one or more rare earth elements and one or more elements selected from the group consisting of Cr, Mn and Al; or
comprising Ti, Zr, V, Ni, Cr, Mn, Sn, Al, Co and one or more rare earth elements; or
comprising Ti, Zr, V, Ni, Cr, Mn, Sn, Al, Co and Y.

E17. An alloy according to any of the preceding embodiments comprising from about 0.1 to about 60% Ti, from about 0.1 to about 40% Zr, 0 to about 60% V, 0 to about 56%

Cr, about 5 to about 22% Mn, about 0.1 to about 57% Ni, about 0.1 to about 3% Sn, about 0.1 to about 10% Al, about 0.1 to about 11% Co and about 0.1 to about 10% one or more rare earth elements; where the percents are atomic % and in total equal 100%; or comprising about 5 to about 15% Ti, about 18 to about 29% Zr, about 3.0 to about 13% V, about 1 to about 10% Cr, about 6 to about 18% Mn, about 29 to about 41% Ni, about 0.1 to about 1% Sn, about 0.1 to about 0.7% Al, about 2 to about 11% Co and about 0.2 to about 5% one or more rare earth elements, where the percents are atomic % and in total equal 100%; or comprising about 11% to about 13% Ti, about 21 to about 23% Zr, about 9 to about 11% V, about 6 to about 9% Cr, about 6 to about 8% Mn, about 31 to about 34% Ni, about 0.2 to about 0.4% Sn, about 0.3 to about 0.6% Al, about 2 to about 8% Co and about 0.2 to about 2.0% one or more rare earth elements, where the percents are atomic % and in total equal 100%.

E18. A hydrogen storage alloy according to any of the preceding embodiments, comprising
a) a C14 or C15 main Laves phase or C14 and C15 main Laves phases,
b) from about 0.1 to about 13.3 wt % of a storage secondary phase and
c) from about 1 to about 40 wt % of a catalytic secondary phase,
where the weight ratio of the catalytic secondary phase abundance to the storage secondary phase abundance is ≥3 or where the weight ratio of the catalytic secondary phase abundance to the storage secondary phase abundance is from about 3 to about 10, from about 3 to about 9, from 3 to about 8, from about 4 to about 10, from 4 to about 9 or from 4 to about 8.

E19. A hydrogen storage alloy according to any of the preceding embodiments, comprising
a) a C14 or C15 main Laves phase or C14 and C15 main Laves phases,
b) from about 0.1 to about 13.3 wt % of a storage secondary phase comprising Y and Ni and
c) from about 1 to about 40 wt % of a catalytic secondary phase comprising Ti and Ni,
where the weight ratio of the catalytic secondary phase abundance to the storage secondary phase abundance is ≥3 or where the weight ratio of the catalytic secondary phase abundance to the storage secondary phase abundance is from about 3 to about 10, from about 3 to about 9, from 3 to about 8, from about 4 to about 10, from 4 to about 9 or from 4 to about 8.

E20. An alloy according to any of the preceding embodiments comprising from about 0.05 at % to about 0.98 at % of one or more rare earth elements; or comprising from about 0.05 at % to about 10.0 at % of one or more rare earth elements or from about 0.1 at % to about 7.0 at %, from about 0.2 at % to about 5.0 at % or from about 0.2 at % to about 2.0 at % of one or more rare earth elements, based on the alloy; or where the alloy contains about 0.05 at %, about 0.1 at %, about 0.15 at %, about 0.20 at %, about 0.25 at %, about 0.30 at %, about 0.35 at %, about 0.40 at %, about 0.45 at %, about 0.50 at %, about 0.55 at %, about 0.60 at %, about 0.65 at %, about 0.70 at %, about 0.75 at %, about 0.80 at %, about 0.85 at %, about 0.90 at %, about 0.95 at % or about 0.98 at % of one or more rare earth elements, based on the alloy, and levels in between.

E21. An alloy according to any of the preceding embodiments comprising Y.

E22. A hydrogen storage alloy according to any of the preceding embodiments which exhibits
an improvement of surface catalytic ability at −40° C., defined as the product of charge transfer resistance (R) and double layer capacitance (C), of at least 10%, at least 15%, at least 20%, at least 25%, at least 30%, at least 35% or at least 40% relative to the $AB_2$ alloy $Ti_{12.0}Zr_{21.5}V_{10.0}Cr_{7.5}Mn_{8.1}Ni_{32.2}Sn_{0.3}Al_{0.4}Co_{8.0}$; and/or
a charge transfer resistance at −40° C. of ≤60, ≤55, ≤50, ≤45, ≤40, ≤37, ≤35, ≤30, ≤25, ≤20 or ≤15 Ω·g; and/or
a surface catalytic ability at −40° C., defined as the product of charge transfer resistance (R) and double layer capacitance (C), of ≤30, ≤25, ≤20, ≤15, ≤12, ≤10.0, ≤9.0, ≤8.0, ≤7.0, ≤6.0 or ≤5.0 seconds; or the surface catalytic ability at −40° C. is from about 5 to about 10, from about 5 to about 9, from about 5 to about 8 or from about 5 to about 7 seconds.

Following are further embodiments of the invention.

E1. A hydrogen storage alloy, for instance having improved low temperature electrochemical properties, comprising at least one main phase and at least one secondary phase, for example
a) at least one main phase,
b) optionally a storage secondary phase, for example from 0 to about 13.3 wt % of a storage secondary phase and
c) a catalytic secondary phase,
where the alloy comprises from about 0.05 at % to about 0.98 at % of one or more rare earth elements; or where the alloy contains from about 0.05 at % to about 10.0 at % of one or more rare earth elements or from about 0.1 at % to about 7.0 at %, from about 0.2 at % to about 5.0 at % or from about 0.2 at % to about 2.0 at % of one or more rare earth elements, based on the alloy; or where the alloy contains about 0.05 at %, about 0.1 at %, about 0.15 at %, about 0.20 at %, about 0.25 at %, about 0.30 at %, about 0.35 at %, about 0.40 at %, about 0.45 at %, about 0.50 at %, about 0.55 at %, about 0.60 at %, about 0.65 at %, about 0.70 at %, about 0.75 at %, about 0.80 at %, about 0.85 at %, about 0.90 at %, about 0.95 at % or about 0.98 at % of one or more rare earth elements, based on the alloy, and levels in between.

E2. An alloy according to embodiment 1 comprising
i) one or more elements selected from the group consisting of A type elements and
ii) one or more elements selected from the group consisting of B type elements and rare earth elements;
for example
i) one or more elements selected from the group consisting of Ti, Zr, Nb and Hf and
ii) one or more elements selected from the group consisting of V, Cr, Mn, Ni, Sn, Al, Co, Cu, Mo, W, Fe, Si and rare earth elements; or
i) one or more elements selected from the group consisting of Ti, Zr, Nb and Hf and
ii) Ni, Cr and one or more elements selected from the group consisting of B, Al, Si, Sn, other transition metals and rare earth elements; or
i) one or more elements selected from the group consisting of Ti, Zr, Nb and Hf and
ii) Ni, Cr and one or more elements selected from the group consisting of V, Mn, Sn, Al, Co, Cu, Mo, W, Fe, Si and rare earth elements,
where the atomic ratio of ii) to i) is from 1.80 to 2.20; or from about 1.80 to about 1.98, from about 1.80 to about 1.95 or from about 1.82 to about 1.93; or about 1.80, about 1.81, about 1.82, about 1.83, about 1.84, about 1.85, about 1.86, about 1.87, about 1.88, about 1.89, about 1.90, about 1.91, about 1.92, about 1.93, about 1.94, about 1.95, about 1.97, about 1.98 or about 1.99.

E3. An alloy according to embodiment 2 where the atomic ratio of ii) to i) is from about 1.80 to about 1.95.

E4. An alloy according to any of the preceding embodiments comprising C14 and C15 main Laves phases where the C14 phase weight abundance is from about 70 to about 95, from about 80 to about 90 or from about 83 to 88 and the C15 phase abundance is from about 2 to about 20, from about 3 to about 15 or from about 3 to 13 by weight, based on the alloy.

E5. An alloy according to any of the preceding embodiments where the catalytic secondary phase has a TiNi (B2) crystal structure.

E6. An alloy according to any of the preceding embodiments where the catalytic secondary phase comprises one or more elements selected from the group consisting of Ti, Zr, Nb and Hf and also comprises Ni.

E7. An alloy according to any of the preceding embodiments where the catalytic secondary phase comprises from about 13 to about 45 at % Ti, from about 15 to about 30 at % Ti or from about 15 to about 25 at % Ti, from about 5 to about 30 at % Zr, from about 15 to about 28 at % Zr or from about 20 to about 26 at % Zr and from about 38 to about 60 at % Ni, from about 40 to about 55 at % Ni or from about 45 to about 50 at % Ni.

E8. An alloy according to any of the preceding embodiments where the catalytic secondary phase abundance is ≥3 and ≤40 wt %; or the catalytic secondary phase weight abundance is from about 1 to about 40, from about 3 to about 20 or about 4, about 5, about 6, about 7, about 8, about 9 or about 10 by weight, based on the alloy.

E9. An alloy according to any of the preceding embodiments where the storage secondary phase abundance is >0 wt %; or from about 0.1 to about 12, from about 0.1 to about 11, from about 0.1 to about 10, from about 0.1 to about 7 or from about 0.1 to about 5; or about 0.5, about 0.8, about 1.1, about 1.4, about 1.7, about 2.0 or about 2.3 and levels in between, by weight based on the alloy.

E10. An alloy according to any of the preceding embodiments comprising a storage secondary phase which comprises one or more rare earth elements; comprises Ni; comprises one or more rare earth elements and Ni; comprises one or more rare earth elements, Ni and Sn; comprises Y and Ni or comprises Y, Ni and Sn.

E11. An alloy according to any of the preceding embodiments comprising a storage secondary phase which comprises from about 15 to about 55 at %, from about 20 to about 50 at %, from about 25 to about 45 at % or from about 30 to about 40 at % one or more rare earth elements; or where the storage secondary phase comprises from about 30 to about 50 at % or from about 30 to about 40 at % one or more rare earth elements and where the storage secondary phase comprises from about 15 to about 50 at % Ni, from about 20 to about 40 at % Ni or from about 20 to about 30 at % Ni.

E12. An alloy according to any of the preceding embodiments comprising a storage secondary phase which comprises from about 15 to about 32 at % Sn, from about 18 to about 30 at % Sn or from about 20 to about 29 at % Sn.

E13. An alloy according to any of the preceding embodiments comprising a storage secondary phase which comprises from about 32 to about 38 at % Y, from about 21 to about 27 at % Ni and from about 20 to about 25 at % Sn.

E14. An alloy according to any of the preceding embodiments comprising from about 2 wt % to about 10 wt %, from about 3 wt % to about 9 wt % or from about 3 wt % to about 8 wt % of a catalytic secondary phase comprising Ti and Ni and from 0 to about 2 wt %, from about 0.01 wt % to about 1.5 wt % or from about 0.05 wt % to about 1.3 wt % of a storage secondary phase comprising Y and Ni, based on the total alloy.

E15. An alloy according to any of the preceding embodiments comprising a storage secondary phase where the weight ratio of the catalytic secondary phase to the storage secondary phase is ≥3, ≥4, ≥5, ≥6 or ≥7 or where the weight ratio of the catalytic secondary phase to the storage secondary phase is from about 3 to about 10, from about 3 to about 9, from 3 to about 8, from about 4 to about 10, from 4 to about 9 or from 4 to about 8.

E16. An alloy according to any of the preceding embodiments
comprising Ti, Zr, V, Ni and one or more rare earth elements; or
comprising Ti, Zr, Ni, Mn and one or more rare earth elements; or
comprising Ti, Cr, V, Ni and one or more rare earth elements; or
comprising Ti, Zr, V, Ni, one or more rare earth elements and one or more elements selected from the group consisting of Cr, Mn, Sn, Al, Cu, Mo, W, Fe, Si and Co; or
comprising Ti, Zr, V, Ni, Cr and one or more elements selected from the group consisting of B, Al, Si, Sn and other transition metals; or
comprising Ti, Zr, V, Ni, one or more rare earth elements and one or more elements selected from the group consisting of Cr, Mn and Al; or
comprising Ti, Zr, V, Ni, Cr, Mn, Sn, Al, Co and one or more rare earth elements; or
comprising Ti, Zr, V, Ni, Cr, Mn, Sn, Al, Co and Y.

E17. An alloy according to any of the preceding embodiments comprising from about 0.1 to about 60% Ti, from about 0.1 to about 40% Zr, 0 to about 60% V, 0 to about 56% Cr, about 5 to about 22% Mn, about 0.1 to about 57% Ni, about 0.1 to about 3% Sn, about 0.1 to about 10% Al, about 0.1 to about 11% Co and about 0.1 to about 10% one or more rare earth elements; where the percents are atomic % and in total equal 100%; or
comprising about 5 to about 15% Ti, about 18 to about 29% Zr, about 3.0 to about 13% V, about 1 to about 10% Cr, about 6 to about 18% Mn, about 29 to about 41% Ni, about 0.1 to about 1% Sn, about 0.1 to about 0.7% Al, about 2 to about 11% Co and about 0.2 to about 5% one or more rare earth elements, where the percents are atomic % and in total equal 100%; or
comprising about 11% to about 13% Ti, about 21 to about 23% Zr, about 9 to about 11% V, about 6 to about 9% Cr, about 6 to about 8% Mn, about 31 to about 34% Ni, about 0.2 to about 0.4% Sn, about 0.3 to about 0.6% Al, about 2 to about 8% Co and about 0.2 to about 2.0% one or more rare earth elements, where the percents are atomic % and in total equal 100%.

E18. A hydrogen storage alloy according to any of the preceding embodiments, comprising
a) at least one main phase,
b) from 0 to about 13.3 wt % of a storage secondary phase and
c) a catalytic secondary phase,
where the alloy comprises
i) one or more elements selected from the group consisting of A type elements and
ii) one or more elements selected from the group consisting of B type elements and rare earth elements;

for example i) one or more elements selected from the group consisting of Ti, Zr, Nb and Hf and ii) one or more elements selected from the group consisting of V, Cr, Mn, Ni, Sn, Al, Co, Cu, Mo, W, Fe, Si and rare earth elements; or i) one or more elements selected from the group consisting of Ti, Zr, Nb and Hf and ii) Ni, Cr and one or more elements selected from the group consisting of B, Al, Si, Sn, other transition metals and rare earth elements; or i) one or more elements selected from the group consisting of Ti, Zr, Nb and Hf and ii) Ni, Cr and one or more elements selected from the group consisting of V, Mn, Sn, Al, Co, Cu, Mo, W, Fe, Si and rare earth elements, where the atomic ratio of ii) to i) is from about 1.80 to about 1.98, from about 1.80 to about 1.95 or from about 1.82 to about 1.93.

E19. A hydrogen storage alloy according to any of the preceding embodiments, comprising a) a C14 or C15 main Laves phase or C14 and C15 main Laves phases, b) from 0 to about 13.3 wt % of a storage secondary phase and c) from about 1 to about 40 wt % of a catalytic secondary phase, where the alloy comprises from about 0.05 at % to about 0.98 at % of Y and where the weight ratio of the catalytic secondary phase abundance to the storage secondary phase abundance is ≥3, ≥4, ≥5, ≥6 or ≥7 or where the weight ratio of the catalytic secondary phase abundance to the storage secondary phase abundance is from about 3 to about 10, from about 3 to about 9, from 3 to about 8, from about 4 to about 10, from 4 to about 9 or from 4 to about 8.

E20. A hydrogen storage alloy according to any of the preceding embodiments, comprising a) a C14 or C15 main Laves phase or C14 and C15 main Laves phases, b) from 0 to about 13.3 wt % of a storage secondary phase comprising Y and Ni and c) from about 1 to about 40 wt % of a catalytic secondary phase comprising Ti and Ni, where the alloy comprises from about 0.05 at % to about 0.98 at % of Y and where the weight ratio of the catalytic secondary phase abundance to the storage secondary phase abundance is ≥3, ≥4, ≥5, ≥6 or ≥7 or where the weight ratio of the catalytic secondary phase abundance to the storage secondary phase abundance is from about 3 to about 10, from about 3 to about 9, from 3 to about 8, from about 4 to about 10, from 4 to about 9 or from 4 to about 8.

E21. A hydrogen storage alloy according to any of the preceding embodiments, comprising a) a C14 or C15 main Laves phase or C14 and C15 main Laves phases, b) from 0 to about 13.3 wt % of a storage secondary phase and c) from about 1 to about 40 wt % of a catalytic secondary phase, where the alloy comprises i) one or more elements selected from the group consisting of A type elements and ii) one or more elements selected from the group consisting of B type elements and rare earth elements;

for example i) one or more elements selected from the group consisting of Ti, Zr, Nb and Hf and ii) one or more elements selected from the group consisting of V, Cr, Mn, Ni, Sn, Al, Co, Cu, Mo, W, Fe, Si and Y, where the atomic ratio of ii) to i) is from about 1.80 to about 1.98, from about 1.80 to about 1.95 or from about 1.82 to about 1.93.

E22. A hydrogen storage alloy according to any of the preceding embodiments, comprising a) a C14 or C15 main Laves phase or C14 and C15 main Laves phases, b) from 0 to about 13.3 wt % of a storage secondary phase comprising Y and Ni and c) from about 1 to about 40 wt % of a catalytic secondary phase comprising Ti and Ni, where the alloy comprises i) one or more elements selected from the group consisting of A type elements and ii) one or more elements selected from the group consisting of B type elements and rare earth elements;

for example i) one or more elements selected from the group consisting of Ti, Zr, Nb and Hf and ii) one or more elements selected from the group consisting of V, Cr, Mn, Ni, Sn, Al, Co, Cu, Mo, W, Fe, Si and Y, where the atomic ratio of ii) to i) is from about 1.80 to about 1.98, from about 1.80 to about 1.95 or from about 1.82 to about 1.93.

E23. A hydrogen storage alloy according to any of the preceding embodiments, comprising a) a C14 or C15 main Laves phase or C14 and C15 main Laves phases, b) from 0 to about 13.3 wt % of a storage secondary phase comprising Y and Ni and c) from about 1 to about 40 wt % of a catalytic secondary phase comprising Ti and Ni, where the alloy comprises from about 0.05 at % to about 0.98 at % of Y, where the weight ratio of the catalytic secondary phase abundance to the storage secondary phase abundance is ≥3, ≥4, ≥5, ≥6 or ≥7 or where the weight ratio of the catalytic secondary phase abundance to the storage secondary phase abundance is from about 3 to about 10, from about 3 to about 9, from 3 to about 8, from about 4 to about 10, from 4 to about 9 or from 4 to about 8 and where the alloy comprises i) one or more elements selected from the group consisting of A type elements and ii) one or more elements selected from the group consisting of B type elements and rare earth elements;

for example i) one or more elements selected from the group consisting of Ti, Zr, Nb and Hf and ii) one or more elements selected from the group consisting of V, Cr, Mn, Ni, Sn, Al, Co, Cu, Mo, W, Fe, Si and Y, where the atomic ratio of ii) to i) is from about 1.80 to about 1.98, from about 1.80 to about 1.95 or from about 1.82 to about 1.93.

E24. An alloy according to any of the preceding embodiments comprising Y.

E25. A hydrogen storage alloy according to any of the preceding embodiments which exhibits
an improvement of surface catalytic ability at −40° C., defined as the product of charge transfer resistance (R) and double layer capacitance (C), of at least 10%, at least 15%, at least 20%, at least 25%, at least 30%, at least 35% or at least 40% relative to the $AB_2$ alloy $Ti_{12.0}Zr_{21.5}V_{10.0}Cr_{7.5}Mn_{8.1}Ni_{32.2}Sn_{0.3}Al_{0.4}Co_{8.0}$; and/or
a charge transfer resistance at −40° C. of ≤60, ≤55, ≤50, ≤45, ≤40, ≤37, ≤35≤30, ≤25, ≤20 or ≤15 Ω·g; and/or
a surface catalytic ability at −40° C., defined as the product of charge transfer resistance (R) and double layer capacitance (C), of ≤30, ≤25, ≤20, ≤15, ≤12, ≤10.0, ≤9.0, ≤8.0, ≤7.0, ≤6.0 or ≤5.0 seconds; or the surface catalytic ability at −40° C. is from about 5 to about 10, from about 5 to about 9, from about 5 to about 8 or from about 5 to about 7 seconds.

Following are further embodiments of the invention.

E1. A hydrogen storage alloy which exhibits
an improvement of surface catalytic ability at −40° C., defined as the product of charge transfer resistance (R) and double layer capacitance (C), of at least 10%, at least 15%, at least 20%, at least 25%, at least 30%, at least 35% or at least 40% relative to the $AB_2$ alloy $Ti_{12.0}Zr_{21.5}V_{10.0}Cr_{7.5}Mn_{8.1}Ni_{32.2}Sn_{0.3}Al_{0.4}Co_{8.0}$; and/or
a charge transfer resistance at −40° C. of ≤60, ≤55, ≤50, ≤45, ≤40, ≤37, ≤35, ≤30, ≤25, ≤20 or ≤15 Ω·g and/or
a surface catalytic ability at −40° C., defined as the product of charge transfer resistance (R) and double layer capacitance (C), of ≤30, ≤25, ≤20, ≤15, ≤12, ≤10.0, ≤9.0, ≤8.0, ≤7.0, ≤6.0 or ≤5.0 seconds; or the surface catalytic ability at −40° C. is from about 5 to about 10, from about 5 to about 9, from about 5 to about 8 or from about 5 to about 7 seconds.

E2. A hydrogen storage alloy according to embodiment 1 comprising at least one main phase and at least one secondary phase, for example
a) at least one main phase,
b) optionally a storage secondary phase, for instance from 0 to about 13.3 wt % of a storage secondary phase and
c) a catalytic secondary phase,
where the alloy comprises from 0.05 at % to 0.98 at % of one or more rare earth elements; or where the alloy contains from about 0.05 at % to about 10.0 at % of one or more rare earth elements or from about 0.1 at % to about 7.0 at %, from about 0.2 at % to about 5.0 at % or from about 0.2 at % to about 2.0 at % of one or more rare earth elements, based on the alloy; or where the alloy contains about 0.05 at %, about 0.1 at %, about 0.15 at %, about 0.20 at %, about 0.25 at %, about 0.30 at %, about 0.35 at %, about 0.40 at %, about 0.45 at %, about 0.50 at %, about 0.55 at %, about 0.60 at %, about 0.65 at %, about 0.70 at %, about 0.75 at %, about 0.80 at %, about 0.85 at %, about 0.90 at %, about 0.95 at % or about 0.98 at % of one or more rare earth elements, based on the alloy, and levels in between.

E3. A hydrogen storage alloy according to embodiments 1 or 2 comprising
a) at least one main phase,
b) from 0 to about 13.3 wt % of a storage secondary phase and
c) a catalytic secondary phase,
where the alloy comprises
i) one or more elements selected from the group consisting of A type elements and
ii) one or more elements selected from the group consisting of B type elements and rare earth elements;
for example
i) one or more elements selected from the group consisting of Ti, Zr, Nb and Hf and
ii) one or more elements selected from the group consisting of V, Cr, Mn, Ni, Sn, Al, Co, Cu, Mo, W, Fe, Si and rare earth elements; or
i) one or more elements selected from the group consisting of Ti, Zr, Nb and Hf and
ii) Ni, Cr and one or more elements selected from the group consisting of B, Al, Si, Sn, other transition metals and rare earth elements; or
i) one or more elements selected from the group consisting of Ti, Zr, Nb and Hf and
ii) Ni, Cr and one or more elements selected from the group consisting of V, Mn, Sn, Al, Co, Cu, Mo, W, Fe, Si and rare earth elements,
where the atomic ratio of ii) to i) is from about 1.80 to about 2.20, from about 1.80 to about 1.98, from about 1.80 to about 1.95 or from about 1.82 to about 1.93.

E4. A hydrogen storage alloy according to any of the preceding embodiments comprising
a) at least one main phase,
b) a storage secondary phase and
c) a catalytic secondary phase,
where the weight ratio of the catalytic secondary phase abundance to the storage secondary phase abundance is ≥3, ≥4, ≥5, ≥6 or ≥7 or where the weight ratio of the catalytic secondary phase abundance to the storage secondary phase abundance is from about 3 to about 10, from about 3 to about 9, from 3 to about 8, from about 4 to about 10, from 4 to about 9 or from 4 to about 8.

E5. An alloy according to any of the preceding embodiments comprising
i) one or more elements selected from the group consisting of A type elements and
ii) one or more elements selected from the group consisting of B type elements and rare earth elements;
for example
i) one or more elements selected from the group consisting of Ti, Zr, Nb and Hf and
ii) one or more elements selected from the group consisting of V, Cr, Mn, Ni, Sn, Al, Co, Cu, Mo, W, Fe, Si and rare earth elements; or
i) one or more elements selected from the group consisting of Ti, Zr, Nb and Hf and
ii) Ni, Cr and one or more elements selected from the group consisting of B, Al, Si, Sn, other transition metals and rare earth elements; or
i) one or more elements selected from the group consisting of Ti, Zr, Nb and Hf and
ii) Ni, Cr and one or more elements selected from the group consisting of V, Mn, Sn, Al, Co, Cu, Mo, W, Fe, Si and rare earth elements,
where the atomic ratio of ii) to i) is from about 1.80 to about 2.20.

E6. An alloy according to any of embodiments 3-5 where the atomic ratio of ii) to i) is from about 1.80 to about 1.99.

E7. An alloy according to any of embodiments 2-6 where the structure of each phase is different.

E8. An alloy according to any of embodiments 2-7 comprising a C14 or C15 main Laves phase or comprising C14 and C15 main Laves phases.

E9. An alloy according to any of embodiments 2-8 comprising C14 and C15 main Laves phases where the C14 phase weight abundance is from about 70 to about 95, from about 80 to about 90 or from about 83 to 88 and the C15 phase abundance is from about 2 to about 20, from about 3 to about 15 or from about 3 to 13 by weight, based on the alloy.

E10. An alloy according to any of embodiments 2-9 where the catalytic secondary phase has a TiNi (B2) crystal structure.

E11. An alloy according to any of embodiments 2-10 where the catalytic secondary phase comprises one or more elements selected from the group consisting of Ti, Zr, Nb and Hf and also comprises Ni.

E12. An alloy according to any of embodiments 2-11 where the catalytic secondary phase comprises Ti and Ni or comprises Ti, Zr and Ni.

E13. An alloy according to any of embodiments 2-12 where the catalytic secondary phase comprises from about 13 to about 45 at % Ti, from about 15 to about 30 at % Ti or from about 15 to about 25 at % Ti.

E14. An alloy according to any of embodiments 2-13 where the catalytic secondary phase comprises from about 5 to about 30 at % Zr, from about 15 to about 28 at % Zr or from about 20 to about 26 at % Zr.

E15. An alloy according to any of embodiments 2-14 where the catalytic secondary phase comprises from about 38 to about 60 at % Ni, from about 40 to about 55 at % Ni or from about 45 to about 50 at % Ni.

E16. An alloy according to any of embodiments 2-15 where the catalytic secondary phase comprises from about 45 to about 49 at % Ni, from about 17 to about 22 at % Ti and from about 20 to about 24 at % Zr where (Ti+Zr) is from about 41 to about 43 at %.

E17. An alloy according to any of embodiments 2-16 where the catalytic secondary phase comprises from about 45 to about 49 at % Ni, from about 17 to about 22 at % Ti and from about 20 to about 24 at % Zr where (Ti+Zr) is from about 41 to about 43 at % and where the at % of Zr is ≥the at % of Ti.

E18. An alloy according to any of embodiments 2-17 where the catalytic secondary phase abundance is ≥3 and ≤40 wt %; or the catalytic secondary phase weight abundance is from about 1 to about 40, from about 3 to about 20 or about 4, about 5, about 6, about 7, about 8, about 9 or about 10 by weight, based on the alloy.

E19. An alloy according to any of embodiments 2-18 where the storage secondary phase comprises one or more rare earth elements.

E20. An alloy according to any of embodiments 2-19 where the storage secondary phase comprises Ni.

E21. An alloy according to any of embodiments 2-20 where the storage secondary phase comprises one or more rare earth elements and Ni or comprises one or more rare earth elements, Ni and Sn.

E22. An alloy according to any of embodiments 2-21 where the storage secondary phase comprises Y and Ni or comprises Y, Ni and Sn.

E23. An alloy according to any of embodiments 2-22 where the storage secondary phase comprises from about 15 to about 55 at %, from about 20 to about 50 at %, from about 25 to about 45 at % or from about 30 to about 40 at % one or more rare earth elements; or the storage secondary phase comprises from about 30 to about 50 at % or from about 30 to about 40 at % one or more rare earth elements.

E24. An alloy according to any of embodiments 2-23 where the storage secondary phase comprises from about 15 to about 50 at % Ni, from about 20 to about 40 at % Ni or from about 20 to about 30 at % Ni.

E25. An alloy according to any of embodiments 2-24 where the storage secondary phase comprises from about 15 to about 32 at % Sn, from about 18 to about 30 at % Sn or from about 20 to about 29 at % Sn.

E26. An alloy according to any of embodiments 2-25 where the storage secondary phase comprises from about 32 to about 38 at % Y, from about 21 to about 27 at % Ni and from about 20 to about 25 at % Sn.

E27. An alloy according to any of embodiments 2-26 where the storage secondary phase abundance is >0 and ≤13.3 wt % or from about 0.1 to about 10, from about 0.1 to about 7 or from about 0.1 to about 5; or about 0.5, about 0.8, about 1.1, about 1.4, about 1.7, about 2.0 or about 2.3 and levels in between, by weight based on the alloy.

E28. An alloy according to any of the preceding embodiments comprising from about 2 wt % to about 10 wt %, from about 3 wt % to about 9 wt % or from about 3 wt % to about 8 wt % of a catalytic secondary phase comprising Ti and Ni and from 0 to about 2 wt %, from about 0.01 wt % to about 1.5 wt % or from about 0.05 wt % to about 1.3 wt % storage secondary phase comprising Y and Ni, based on the total alloy.

E29. An alloy according to any of the preceding embodiments comprising from about 0.05 at % to about 10.0 at % of one or more rare earth elements or from about 0.1 at % to about 7.0 at %, from about 0.2 at % to about 5.0 at % or from about 0.2 at % to about 2.0 at % of one or more rare earth elements, based on the alloy.

E30. An alloy according to any of the preceding embodiments
comprising Ti, Zr, V, Ni and one or more rare earth elements; or
comprising Ti, Zr, Ni, Mn and one or more rare earth elements; or
comprising Ti, Cr, V, Ni and one or more rare earth elements; or
comprising Ti, Zr, V, Ni, one or more rare earth elements and one or more elements selected from the group consisting of Cr, Mn, Sn, Al, Cu, Mo, W, Fe, Si and Co; or
comprising Ti, Zr, V, Ni, Cr and one or more elements selected from the group consisting of B, Al, Si, Sn and other transition metals; or
comprising Ti, Zr, V, Ni, one or more rare earth elements and one or more elements selected from the group consisting of Cr, Mn and Al; or
comprising Ti, Zr, V, Ni, Cr, Mn, Sn, Al, Co and one or more rare earth elements; or
comprising Ti, Zr, V, Ni, Cr, Mn, Sn, Al, Co and Y.

E31. An alloy according to any of the preceding embodiments comprising Y.

E32. An alloy according to any of the preceding embodiments
comprising about 0.1 to about 60% Ti, about 0.1 to about 40% Zr, 0<V<60%, 0 to about 56% Cr, about 5 to about 22% Mn, about 0.1 to about 57% Ni, about 0.1 to about 3% Sn, about 0.1 to about 10% Al, about 0.1 to about 11% Co and about 0.1 to about 10% one or more rare earth elements; or
comprising about 5 to about 15% Ti, about 18 to about 29% Zr, about 3.0 to about 13% V, about 1 to about 10% Cr, about 6 to about 18% Mn, about 29 to about 41% Ni, about 0.1 to about 1% Sn, about 0.1 to about 0.7% Al, about 2 to about 11% Co and about 0.2 to about 5% one or more rare earth elements; or
comprising about 11% to about 13% Ti, about 21 to about 23% Zr, about 9 to about 11% V, about 6 to about 9% Cr, about 6 to about 8% Mn, about 31 to about 34% Ni, about 0.2 to about 0.4% Sn, about 0.3 to about 0.6% Al, about 2 to about 8% Co and about 0.2 to about 2.0% one or more rare earth elements,
where the percents are atomic % and in total equal 100%.

Following are additional embodiments of the invention.

E1. A hydrogen storage alloy, for example a hydrogen storage alloy having improved low temperature electrochemical properties, comprising at least one main phase and at least one secondary phase, for example
a) at least one main phase,
b) optionally a storage secondary phase, for example from 0 to about 13.3 wt % of a storage secondary phase and
c) a catalytic secondary phase, where the alloy comprises
i) one or more elements selected from the group consisting of A type elements and
ii) one or more elements selected from the group consisting of B type elements and rare earth elements;
for example
i) one or more elements selected from the group consisting of Ti, Zr, Nb and Hf and
ii) one or more elements selected from the group consisting of V, Cr, Mn, Ni, Sn, Al, Co, Cu, Mo, W, Fe, Si and rare earth elements; or
i) one or more elements selected from the group consisting of Ti, Zr, Nb and Hf and
ii) Ni, Cr and one or more elements selected from the group consisting of B, Al, Si, Sn, other transition metals and rare earth elements; or
i) one or more elements selected from the group consisting of Ti, Zr, Nb and Hf and
ii) Ni, Cr and one or more elements selected from the group consisting of V, Mn, Sn, Al, Co, Cu, Mo, W, Fe, Si and rare earth elements,
where the atomic ratio of ii) to i) is from about 1.80 to about 1.98, from about 1.80 to about 1.95 or from about 1.82 to about 1.93; or is about 1.80, about 1.81, about 1.82, about 1.83, about 1.84, about 1.85, about 1.86, about 1.87, about 1.88, about 1.89, about 1.90, about 1.91, about 1.92, about 1.93, about 1.94, about 1.95, about 1.97 or about 1.98.

E2. An alloy according to embodiment 1 where the atomic ratio of ii) to i) is from about 1.80 to about 1.95.

E3. An alloy according to embodiment 1 comprising C14 and C15 main Laves phases where the C14 phase weight abundance is from about 70 to about 95, from about 80 to about 90 or from about 83 to 88 and the C15 phase abundance is from about 2 to about 20, from about 3 to about 15 or from about 3 to 13 by weight, based on the alloy.

E4. An alloy according to any of the preceding embodiments where the catalytic secondary phase has a TiNi (B2) crystal structure.

E5. An alloy according to any of the preceding embodiments where the catalytic secondary phase comprises one or more elements selected from the group consisting of Ti, Zr, Nb and Hf and also comprises Ni.

E6. An alloy according to any of the preceding embodiments where the catalytic secondary phase comprises from about 13 to about 45 at % Ti, from about 15 to about 30 at % Ti or from about 15 to about 25 at % Ti, from about 5 to about 30 at % Zr, from about 15 to about 28 at % Zr or from about 20 to about 26 at % Zr and from about 38 to about 60 at % Ni, from about 40 to about 55 at % Ni or from about 45 to about 50 at % Ni.

E7. An alloy according to any of the preceding embodiments where the catalytic secondary phase abundance is ≥3 and ≤40 wt %; or the catalytic secondary phase weight abundance is from about 1 to about 40, from about 3 to about 20 or about 4, about 5, about 6, about 7, about 8, about 9 or about 10 by weight, based on the alloy.

E8. An alloy according to any of the preceding embodiments where the storage secondary phase weight abundance is >0 and ≤13.3; or from about 0.1 to about 13.3, from about 0.1 to about 10, from about 0.1 to about 7 or from about 0.1 to about 5; or about 0.5, about 0.8, about 1.1, about 1.4, about 1.7, about 2.0 or about 2.3 and levels in between, by weight based on the alloy.

E9. An alloy according to any of the preceding embodiments comprising a storage secondary phase which comprises one or more rare earth elements and Ni or comprises one or more rare earth elements, Ni and Sn.

E10. An alloy according to any of the preceding embodiments comprising a storage secondary phase which comprises from about 15 to about 55 at %, from about 20 to about 50 at %, from about 25 to about 45 at % or from about 30 to about 40 at % one or more rare earth elements; or which comprises from about 30 to about 50 at % or from about 30 to about 40 at % one or more rare earth elements and comprises from about 15 to about 50 at % Ni, from about 20 to about 40 at % Ni or from about 20 to about 30 at % Ni.

E11. An alloy according to any of the preceding embodiments comprising a storage secondary phase which comprises from about 15 to about 32 at % Sn, from about 18 to about 30 at % Sn or from about 20 to about 29 at % Sn.

E12. An alloy according to any of the preceding embodiments comprising a storage secondary phase which contains from about 32 to about 38 at % Y, from about 21 to about 27 at % Ni and from about 20 to about 28 at % Sn.

E13. An alloy according to any of the preceding embodiments comprising from about 2 wt % to about 10 wt % of a catalytic secondary phase comprising Ti and Ni and from about 0.01 to about 2 wt % of a storage secondary phase comprising Y and Ni.

E14. An alloy according to any of the preceding embodiments where the weight ratio of the catalytic secondary phase abundance to the storage secondary phase abundance is ≥3, ≥4, ≥5, ≥6 or ≥7 or is from about 3 to about 10, from about 3 to about 9, from 3 to about 8, from about 4 to about 10, from 4 to about 9 or from 4 to about 8.

E15. An alloy according to any of the preceding embodiments
comprising Ti, Zr, V, Ni and one or more rare earth elements; or
comprising Ti, Zr, Ni, Mn and one or more rare earth elements; or
comprising Ti, Cr, V, Ni and one or more rare earth elements; or
comprising Ti, Zr, V, Ni, one or more rare earth elements and one or more elements selected from the group consisting of Cr, Mn, Sn, Al, Cu, Mo, W, Fe, Si and Co; or
comprising Ti, Zr, V, Ni, Cr and one or more elements selected from the group consisting of B, Al, Si, Sn and other transition metals; or
comprising Ti, Zr, V, Ni, one or more rare earth elements and one or more elements selected from the group consisting of Cr, Mn and Al; or
comprising Ti, Zr, V, Ni, Cr, Mn, Sn, Al, Co and one or more rare earth elements; or
comprising Ti, Zr, V, Ni, Cr, Mn, Sn, Al, Co and Y.

E16. An alloy according to any of the preceding embodiments comprising from about 0.1 to about 60% Ti, about 0.1 to about 40% Zr, 0<V<60%, 0 to about 56% Cr, about 5 to about 22% Mn, about 0.1 to about 57% Ni, about 0.1 to about 3% Sn, about 0.1 to about 10% Al, about 0.1 to about 11% Co and about 0.1 to about 10% one or more rare earth elements; where the percents are atomic % and in total equal 100%.

E17. An alloy according to any of the preceding embodiments comprising Y.

E18. A hydrogen storage alloy according to any of the preceding embodiments which exhibits
an improvement of surface catalytic ability at −40° C., defined as the product of charge transfer resistance (R) and double layer capacitance (C), of at least 10%, at least 15%, at least 20%, at least 25%, at least 30%, at least 35% or at least 40% relative to the $AB_2$ alloy $Ti_{12.0}Zr_{21.5}V_{10.0}Cr_{7.5}Mn_{8.1}Ni_{32.2}Sn_{0.3}Al_{0.4}Co_{8.0}$; and/or a charge transfer resistance at −40° C. of ≤60, ≤55, ≤50, ≤45, ≤40, ≤37, ≤35, ≤30, ≤25, ≤20 or ≤15 Ω·g; and/or a surface catalytic ability at −40° C., defined as the product of charge transfer resistance (R) and double layer capacitance (C), of ≤30, ≤25, ≤20, ≤15, ≤12, ≤10.0, ≤9.0, ≤8.0, ≤7.0, ≤6.0 or ≤5.0 seconds; or the surface catalytic ability at −40° C. is from about 5 to about 10, from about 5 to about 9, from about 5 to about 8 or from about 5 to about 7 seconds.

Following are a further set of embodiments.

E1. A metal hydride battery, a solid hydrogen storage media, an alkaline fuel cell or a metal hydride air battery comprising a hydrogen storage alloy according to any of the before mentioned embodiments (any embodiment of the previous 4 sets of embodiments).

E2. A metal hydride battery comprising at least one anode capable of reversibly charging and discharging hydrogen, at least one cathode capable of reversible oxidation, a casing having said anode and cathode positioned therein, a separator separating the cathode and the anode and an electrolyte in contact with both the anode and the cathode, where the anode comprises a hydrogen storage alloy according to any of the embodiments of the above 4 sets of embodiments.

E3. An alkaline fuel cell comprising at least one hydrogen electrode, at least one oxygen electrode and at least one gas diffusion material, where the hydrogen electrode comprises a hydrogen storage alloy according to any of the embodiments of the above 4 sets of embodiments.

E4. A metal hydride air battery comprising at least one air permeable cathode, at least one anode, at least one air inlet and an electrolyte in contact with both the anode and the cathode, where the anode comprises a hydrogen storage alloy according to any of the embodiments of the above 4 sets of embodiments.

E5. Use of an alloy according to any of the embodiments of the above 4 sets of embodiments in an electrode in a metal hydride battery, a fuel cell or a metal hydride air battery.

E6. Use of an alloy according to any of the embodiments of the above 4 sets of embodiments as a hydrogen storage media.

Example 1 Y Modified Ti—Zr—V—Cr—Mn—Ni—Sn—Al—Co Alloys

Arc melting is performed under a continuous argon flow with a non-consumable tungsten electrode and a water-cooled copper tray. Before each run, a piece of sacrificial titanium undergoes a few melting/cooling cycles to reduce the residual oxygen concentration in the system. Each 12 g ingot is re-melted and turned over a few times to ensure uniformity in chemical composition. The chemical composition of each sample is examined using a Varian LIBERTY 100 inductively-coupled plasma (ICP) system. AC impedance measurements are conducted using a SOLARTRON 1250 Frequency Response Analyzer with sine wave of amplitude 10 mV and frequency range of 10 mHz to 10 kHz. Prior to the measurements, the electrodes are subjected to one full charge/discharge cycle at C/10 rate using a SOLARTRON 1470 Cell Test galvanostat, then recharged to 100% state-of-charge (SOC), subsequently discharged to 80% (SOC) and finally cooled to −40° C. Two more cycles are performed at room temperature and the −40° C. AC impedance measurement is repeated.

The alloys below are designed, values in atomic percent.

| alloy | Ti | Zr | V | Cr | Mn | Ni | Sn | Al | Co | Y | ii)/i) ratio |
|---|---|---|---|---|---|---|---|---|---|---|---|
| 0 | 12.0 | 21.5 | 10.0 | 7.5 | 8.1 | 32.2 | 0.3 | 0.4 | 8.0 | 0.0 | 1.99 |
| 1 | 12.0 | 21.5 | 10.0 | 7.5 | 8.1 | 32.2 | 0.3 | 0.4 | 7.0 | 1.0 | 1.99 |
| 2 | 12.0 | 21.5 | 10.0 | 7.5 | 8.1 | 32.2 | 0.3 | 0.4 | 6.0 | 2.0 | 1.99 |
| 3 | 12.0 | 21.5 | 10.0 | 7.5 | 8.1 | 32.2 | 0.3 | 0.4 | 5.0 | 3.0 | 1.99 |
| 4 | 12.0 | 21.5 | 10.0 | 7.5 | 8.1 | 32.2 | 0.3 | 0.4 | 4.0 | 4.0 | 1.99 |
| 5 | 12.0 | 21.5 | 10.0 | 7.5 | 8.1 | 32.2 | 0.3 | 0.4 | 3.0 | 5.0 | 1.99 |
| 6 | 12.1 | 21.6 | 10.1 | 7.6 | 8.2 | 32.4 | 0.3 | 0.4 | 7.0 | 0.3 | 1.97 |
| 7 | 12.2 | 21.8 | 10.1 | 7.6 | 8.2 | 32.6 | 0.3 | 0.4 | 6.1 | 0.6 | 1.94 |
| 8 | 12.3 | 22.0 | 10.2 | 7.7 | 8.3 | 32.9 | 0.3 | 0.4 | 5.1 | 1.0 | 1.92 |
| 9 | 12.3 | 22.1 | 10.3 | 7.7 | 8.3 | 33.1 | 0.3 | 0.4 | 4.1 | 1.3 | 1.90 |
| 10 | 12.4 | 22.3 | 10.4 | 7.8 | 8.4 | 33.3 | 0.3 | 0.4 | 3.1 | 1.6 | 1.88 |

The designed alloys have the actual atomic percentages, determined by ICP, as follows.

| alloy | Ti | Zr | V | Cr | Mn | Ni | Sn | Al | Co | Y | ii)/i) ratio |
|---|---|---|---|---|---|---|---|---|---|---|---|
| 0 | 12.0 | 21.5 | 10.0 | 7.5 | 8.1 | 32.2 | 0.4 | 0.3 | 8.0 | 0.0 | 1.99 |
| 1 | 12.0 | 21.7 | 10.0 | 7.8 | 6.8 | 33.0 | 0.3 | 0.5 | 7.0 | 0.9 | 1.97 |
| 2 | 12.1 | 21.8 | 10.0 | 7.7 | 6.6 | 33.1 | 0.3 | 0.5 | 6.0 | 1.9 | 1.95 |
| 3 | 12.1 | 21.8 | 10.1 | 7.7 | 6.7 | 33.0 | 0.3 | 0.4 | 5.1 | 2.8 | 1.95 |
| 4 | 12.3 | 21.6 | 10.1 | 7.4 | 6.7 | 33.0 | 0.3 | 0.5 | 4.0 | 4.0 | 1.95 |
| 5 | 12.0 | 21.6 | 10.0 | 7.5 | 6.9 | 33.2 | 0.3 | 0.4 | 3.0 | 5.0 | 1.97 |
| 6 | 12.2 | 21.9 | 10.2 | 7.4 | 6.5 | 33.4 | 0.3 | 0.5 | 7.1 | 0.4 | 1.93 |
| 7 | 12.3 | 22.2 | 10.5 | 7.6 | 5.7 | 34.1 | 0.3 | 0.5 | 6.2 | 0.6 | 1.90 |
| 8 | 12.3 | 22.3 | 10.6 | 7.7 | 6.4 | 33.8 | 0.3 | 0.5 | 5.2 | 0.9 | 1.89 |
| 9 | 12.5 | 22.6 | 10.5 | 7.5 | 6.7 | 34.1 | 0.3 | 0.4 | 4.2 | 1.2 | 1.85 |
| 10 | 12.6 | 22.7 | 10.4 | 7.4 | 7.1 | 34.0 | 0.3 | 0.4 | 3.3 | 1.6 | 1.83 |

Alloys 6-10 are inventive. Alloys 0-5 are comparative. Comparative alloys are discussed in K. Young, et al., *Journal of Alloys and Compounds*, "Electrochemical Performance of AB$_2$ Metal Hydride Alloys Measured at −40° C." (2013), Elsevier, 580 (2013) S349-S352.

The ii)/i) ratio is the atomic ratio (V—Cr—Mn—Ni—Sn—Al—Co—Y)/(Ti—Zr).

Mn loss due to evaporation during melting is noticeable for preparing alloys with Y which require higher power to achieve ingot uniformity.

The electrochemical results are below.

| alloy | R (RT) | C (RT) | R·C (RT) | R (−40° C.) | C (−40° C.) | R·C (−40° C.) |
|---|---|---|---|---|---|---|
| 0 | 0.82 | 0.15 | 0.12 | 70 | 0.12 | 8.4 |
| 1 | 0.80 | 0.23 | 0.18 | 84 | 0.20 | 16.8 |
| 2 | 0.55 | 0.45 | 0.25 | 75 | 0.42 | 31.5 |
| 3 | 0.46 | 0.67 | 0.31 | 51 | 0.62 | 31.6 |
| 4 | 0.39 | 0.89 | 0.35 | 42 | 0.80 | 33.6 |
| 5 | 0.51 | 1.07 | 0.55 | 39 | 1.04 | 40.6 |
| 6 | 0.18 | 0.34 | 0.06 | 15 | 0.32 | 4.8 |
| 7 | 0.24 | 0.31 | 0.07 | 28 | 0.25 | 7.0 |
| 8 | 0.26 | 0.29 | 0.08 | 24 | 0.25 | 6.0 |
| 9 | 0.25 | 0.34 | 0.08 | 24 | 0.30 | 7.2 |
| 10 | 0.25 | 0.36 | 0.09 | 22 | 0.32 | 7.0 |

RT is room temperature.
R is charge transfer resistance (Ω · g).
C is double layer capacitance (Farad/g).
The R and C values are calculated from the Cole-Cole plot of AC impedance measurements.

It is seen that the Y-modified alloys 6-10 have vastly improved R·C at −40° C. values vs. the Y-modified alloys 1-5 as well as an alloy that is not modified (alloy 0). Lower values of R·C at −40° C. are desired. For instance the R·C at −40° C. improvement of alloy 8 over alloy 2 is 81%.

Besides main C14 and C15 phases, two additional phases are identified with a Philips X'PERT PRO X-ray diffractometer (XRD). The abundance of the C14, C15, storage secondary YNi and catalytic secondary TiNi phases are below (XRD, analyzed by JADE 9 software). Abundance is weight percent, based on the total alloy.

| alloy | C14 | C15 | TiNi | YNi | TiNi/YNi |
|---|---|---|---|---|---|
| 0 | 98.6 | nd | 1.4 | nd | — |
| 1 | 72.0 | 24.9 | 3.2 | nd | — |
| 2 | 75.7 | 18.3 | 4.4 | 1.6 | 2.75 |
| 3 | 79.0 | 10.5 | 6.7 | 3.8 | 1.76 |
| 4 | 86.1 | nd | 9.5 | 4.4 | 2.16 |
| 5 | 84.1 | nd | 11.5 | 4.4 | 2.61 |
| 6 | 83.7 | 12.3 | 3.9 | nd | — |
| 7 | 83.9 | 12.0 | 4.1 | nd | — |
| 8 | 84.4 | 9.9 | 4.6 | 1.1 | 4.18 |
| 9 | 89.1 | 3.4 | 6.6 | 0.9 | 7.33 |
| 10 | 87.5 | 3.7 | 7.6 | 1.2 | 6.33 |

The term "nd" means "not detectable" or "below detection limit".

A JEOL-JSM6320F scanning electron microscope (SEM) equipped with energy dispersive spectroscopy (EDS) is used to study the phase distribution and the corresponding compositions. The crystal structure of the TiNi phases, although they generally contain more Zr than Ti, is the TiNi (B2) crystal structure according to XRD. The above TiNi phases contain from 41 to 43 at % (Zr+Ti), from 45 to 49 at % Ni, from 17 to 22 at % Ti and from 20 to 24 at % Zr. The above YNi phases contain from 32 to 38 at % Y, from 21 to 27 at % Ni and from 20 to 28 at % Sn.

Example 2 Sc, La or Mischmetal Modified Ti—Zr—V—Cr—Mn—Ni—Sn—Al—Co Alloy

Example 1 is repeated, replacing Y with Sc, La or mischmetal.

The invention claimed is:

1. A hydrogen storage alloy comprising
a) at least one main phase,
b) a storage secondary phase comprising Y and
c) a catalytic secondary phase,
where the weight ratio of the catalytic secondary phase to the storage secondary phase is about 3 to about 10
and
where the main phase or phases in total are present at a higher abundance by weight than each of the secondary phases
where the alloy comprises $Ti_{(12.2-12.6)}Zr_{(21.9-22.7)}V_{(10.2-10.6)}Cr_{(7.4-7.7)}Mn_{(5.7-7.1)}Ni_{(33.4-34.1)}Sn_{(0.3)}Al_{(0.4-0.5)}Co_{(3.3-7.1)}Y_{(0.4-1.6)}$
and which exhibits
a surface catalytic ability at −40° C., defined as the product of charge transfer resistance (R) and double layer capacitance (C), of ≤10 seconds.

2. An alloy according to claim 1 which exhibits a surface catalytic ability at −40° C. of ≤8.0 seconds.

3. An alloy according to claim 1 comprising >0 and ≤13.3 wt % of a storage secondary phase.

4. An alloy according to claim 1 comprising a C14 or C15 main Laves phase or comprising C14 and C15 main Laves phases.

5. An alloy according to claim 1 comprising C14 and C15 main Laves phases where the C14 phase abundance is from about 70 to about 95 wt % and the C15 phase abundance is from about 2 to about 20 wt %, based on the alloy.

6. An alloy according to claim 1 comprising a catalytic secondary phase having a TiNi (B2) crystal structure.

7. An alloy according to claim 1 comprising a catalytic secondary phase comprising Ti and Ni or comprises Ti, Zr and Ni.

8. An alloy according to claim 1 comprising a catalytic secondary phase comprising from about 13 to about 45 at % Ti.

9. An alloy according to claim 1 comprising a catalytic secondary phase comprising from about 5 to about 30 at % Zr.

10. An alloy according to claim 1 comprising catalytic secondary phase comprising from about 38 to about 60 at % Ni.

11. An alloy according to claim 1 comprising a catalytic secondary phase comprising from about 45 to about 49 at % Ni, from about 17 to about 22 at % Ti and from about 20 to about 24 at % Zr where (Ti+Zr) is from about 41 to about 43 at %.

12. An alloy according to claim 1 comprising a catalytic secondary phase comprising from about 45 to about 49 at % Ni, from about 17 to about 22 at % Ti and from about 20 to about 24 at % Zr where (Ti+Zr) is from about 41 to about 43 at % and where the at % of Zr is ≥the at % of Ti.

13. An alloy according to claim 1 comprising a catalytic secondary phase having an abundance of ≥3 and ≤40 wt %.

14. An alloy according to claim 1 comprising a storage secondary phase comprising Ni.

15. An alloy according to claim 1 comprising a storage secondary phase comprising Y and Ni or comprises Y, Ni and Sn.

16. An alloy according to claim 1 comprising a storage secondary phase comprising from about 15 to about 55 at % one or more rare earth elements.

17. An alloy according to claim 1 comprising a storage secondary phase comprising from about 15 to about 50 at % Ni.

18. An alloy according to claim 1 comprising a storage secondary phase comprising from about 15 to about 32 at % Sn.

19. An alloy according to claim 1 comprising a storage secondary phase comprising from about 32 to about 38 at % Y, from about 21 to about 27 at % Ni and from about 20 to about 25 at % Sn.

20. An alloy according to claim 1 where a storage secondary phase having an abundance of >0 and ≤13.3 wt %.

21. An alloy according to claim 1 comprising from about 2 wt % to about 10 wt % of a catalytic secondary phase comprising Ti and Ni and from about 0.01 wt % to about 1.5 wt % of a storage secondary phase comprising Y and Ni.

22. A metal hydride battery, a solid hydrogen storage media, an alkaline fuel cell or a metal hydride air battery comprising a hydrogen storage alloy according to claim 1.

* * * * *